United States Patent
Albero et al.

(10) Patent No.: US 11,145,022 B1
(45) Date of Patent: Oct. 12, 2021

(54) DYNAMIC UNAUTHORIZED ACTIVITY DETECTION AND CONTROL SYSTEM

(71) Applicant: Bank of America Corporation, Charlotte, NC (US)

(72) Inventors: George Albero, Charlotte, NC (US); Youshika C. Scott, Charlotte, NC (US); Charlene L. Ramsue, Statesville, NC (US)

(73) Assignee: Bank of America Corporation, Charlotte, NC (US)

( * ) Notice: Subject to any disclaimer, the term of this patent is extended or adjusted under 35 U.S.C. 154(b) by 40 days.

(21) Appl. No.: 16/865,535

(22) Filed: May 4, 2020

(51) Int. Cl.
| | |
|---|---|
| *G06Q 50/00* | (2012.01) |
| *G06Q 50/26* | (2012.01) |
| *G06Q 20/18* | (2012.01) |
| *G06Q 20/10* | (2012.01) |
| *G06F 16/23* | (2019.01) |
| *G06K 9/00* | (2006.01) |
| *G08B 13/196* | (2006.01) |
| *G06Q 40/02* | (2012.01) |

(52) U.S. Cl.
CPC ....... *G06Q 50/265* (2013.01); *G06F 16/2379* (2019.01); *G06K 9/00469* (2013.01); *G06Q 20/1085* (2013.01); *G06Q 20/18* (2013.01); *G06Q 40/02* (2013.01); *G08B 13/19695* (2013.01); *G06K 2209/01* (2013.01)

(58) Field of Classification Search
USPC .................................................... 705/35, 43
See application file for complete search history.

(56) References Cited

U.S. PATENT DOCUMENTS

| | | | |
|---|---|---|---|
| 6,351,552 B1* | 2/2002 | Weaver | G07D 7/0047 382/135 |
| 6,588,569 B1* | 7/2003 | Jenrick | G07D 11/13 194/206 |
| 6,774,986 B2 | 8/2004 | Laskowski | |
| 6,843,418 B2 | 1/2005 | Jones et al. | |
| 6,883,707 B2 | 4/2005 | Nagasaka et al. | |
| 7,200,255 B2 | 4/2007 | Jones et al. | |
| 7,454,049 B2 | 11/2008 | Paraskevakos | |
| 7,903,863 B2* | 3/2011 | Jones | G06Q 20/042 382/135 |
| 7,978,899 B2 | 7/2011 | Jenrick et al. | |
| 8,391,583 B1 | 3/2013 | Mennie et al. | |

(Continued)

*Primary Examiner* — William E Rankins
(74) *Attorney, Agent, or Firm* — Banner & Witcoff, Ltd.; Michael A. Springs

(57) ABSTRACT

Systems for dynamically detecting and controlling unauthorized activity are presented. In some examples, a request for a withdrawal may be received by a self-service kiosk. A plurality of bills may be transferred from a storage area to a dispensing device of the self-service kiosk. In some examples, the plurality of bills may be scanned to capture data associated with each bill. This data may be stored in a bill identification database. An error notification may be received by the self-service kiosk from a user. In response, bills within the self-service kiosk may be scanned to identify unique identifiers associated with the bills in the self-service kiosk. If the bills identified as dispensed are present, an error or malfunction has occurred and a user account may be credited. If the bills are not present, the activity may be identified as unauthorized activity and one or more mitigating actions may be executed.

21 Claims, 26 Drawing Sheets

(56) References Cited

U.S. PATENT DOCUMENTS

| | | | |
|---|---|---|---|
| 8,417,017 B1 * | 4/2013 | Beutel | G06Q 20/042 |
| | | | 382/135 |
| 8,474,708 B2 | 7/2013 | Laskowski | |
| 8,644,583 B1 | 2/2014 | Mennie et al. | |
| 8,682,917 B2 | 3/2014 | Eskin | |
| 9,299,206 B2 | 3/2016 | Angus et al. | |
| 2006/0073883 A1 * | 4/2006 | Franks, Jr. | G07F 17/42 |
| | | | 463/25 |
| 2015/0348350 A1 | 12/2015 | Collins, Jr. et al. | |
| 2016/0180310 A1 * | 6/2016 | Taylor | G07F 19/201 |
| | | | 705/21 |
| 2020/0273299 A1 * | 8/2020 | Konecny | H04L 9/3242 |

* cited by examiner

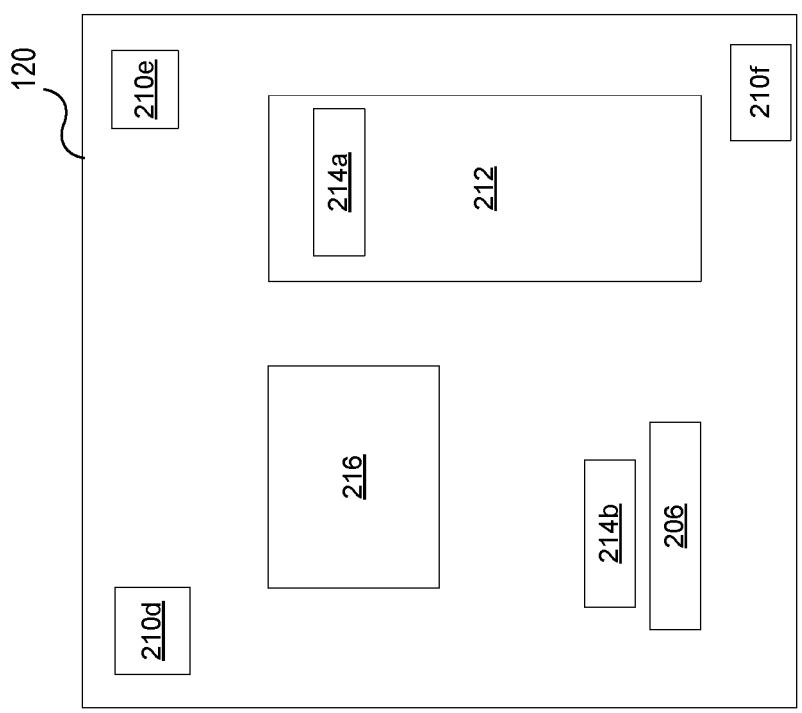

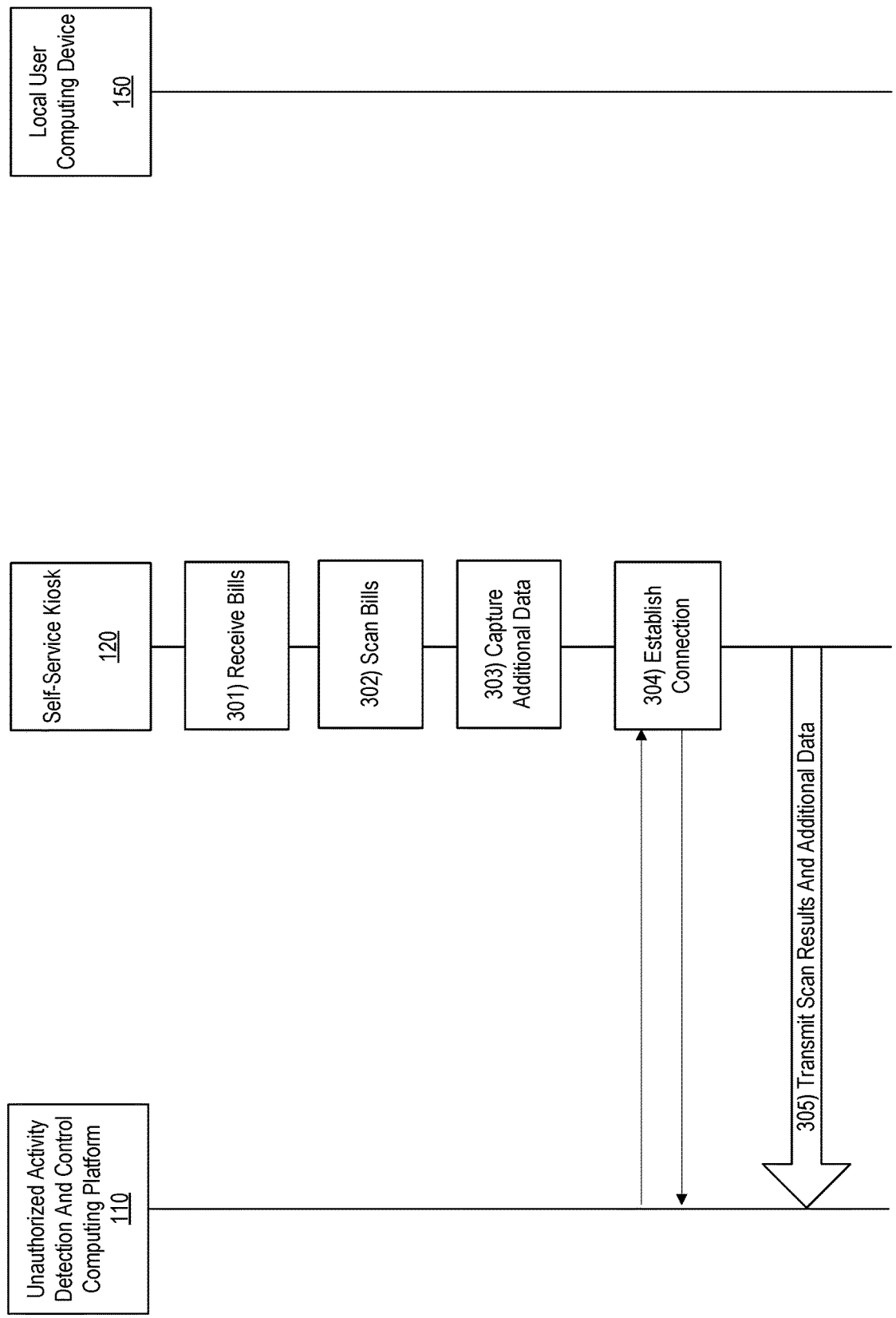

An Error Occurred

We noticed an error in your recent withdrawal. Your account has been credited $x.xx. We apologize for the inconvenience.

Unauthorized Activity Detected

Unauthorized activity was detected at self-service kiosk 123 on date at time.

The associated account(s) have been locked.

DYNAMIC UNAUTHORIZED ACTIVITY DETECTION AND CONTROL SYSTEM

BACKGROUND

Aspects of the disclosure relate to electrical computers, systems, and devices for dynamic unauthorized event detection and processing functions.

Unauthorized activity can occur during various types of event processing functions. However, when using automated systems, it is often easier to execute unauthorized activity than when dealing with a person acting as an associate, customer service representative, or the like. For instance, when using a self-service kiosk, such as an automated teller machine (ATM) or the like, a user may request a withdrawal and, in some instances of unauthorized activity, may claim that the ATM did not dispense the funds or the full amount of the requested withdrawal. In another example of potential unauthorized activity, a user may deposit items into an ATM that are not valid items for deposit. In conventional systems, it may be difficult to detect these and similar types of unauthorized activity in an efficient manner in order to execute mitigating actions.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with detecting and controlling response to unauthorized activity.

In some examples, a request for a withdrawal may be received by, for example, a self-service kiosk. The request may include a request for an amount of currency. The request may be processed and a plurality of bills corresponding to the amount of currency may be transferred from a storage area in the self-service kiosk to a dispensing device of the self-service kiosk. In some examples, the plurality of bills may be scanned to capture data associated with each bill, such as a unique identifier, denomination, current location, time, date, and the like. In some examples, an indication that the bills are being dispensed may be captured. This data may be stored in a bill identification database that may store data associated with currency in circulation. By capturing and storing the data associated with bills in circulation, a route of circulation associated with a bill may be determined and unauthorized activity patterns or events may be detected.

After transferring the bills for dispensing, an error notification may be received by the self-service kiosk. In some examples, the error notification may be received from a user and may indicate that the bills were not dispensed or the correct amount was not dispensed. In response, in some examples, bills within the self-service kiosk may be scanned to identify unique identifiers associated with the bills in the self-service kiosk. If the bills identified as dispensed are present, an error or malfunction has occurred and a user account may be credited. If the bills are not present, the activity may be identified as unauthorized activity and one or more mitigating actions may be executed.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A and 2B depict schematic illustrations of a self-service kiosk that may be used in accordance with one or more aspects described herein;

FIGS. 3A-3C depict an illustrative event sequence for capturing and storing currency data in accordance with one or more aspects described herein;

FIG. 8 illustrates one example user interface that may be generated according to one or more aspects described herein;

FIG. 9 illustrates one example user interface that may be generated according to one or more aspects described herein;

DETAILED DESCRIPTION

Figure 1A:
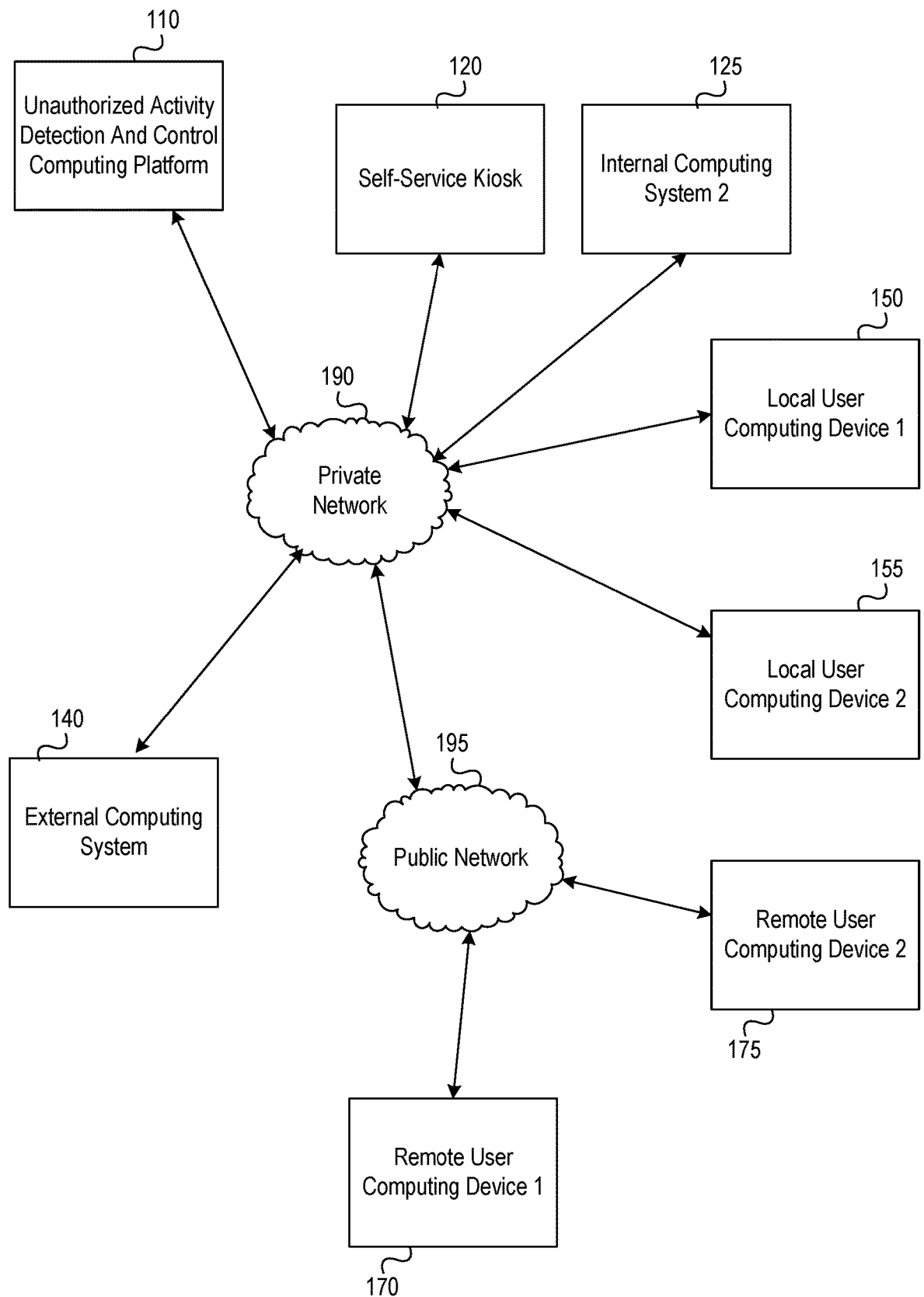
FIGS. 1A and 1B depict an illustrative computing environment for implementing dynamic unauthorized activity detection and control functions in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, unauthorized activity can occur through various channels. However, in some examples, it may be easier to execute unauthorized activity events at self-service kiosks, such as an automated teller machine (ATM), automated teller assistant (ATA), or the like. For instance, in some examples, an ATM may indicate that an amount of funds was dispensed, however, a user may claim that the funds were not dispensed or that an incorrect amount was dispensed. In conventional arrangements, the ATM does not have the capability to evaluate how much was dispensed, which bills of various denominations were dispensed, or the like.

In another example of unauthorized activity conducted at a self-service kiosk, a user may request a deposit and may insert one or more items into an ATM for deposit. In some examples, the items inserted may not be valid items for deposit. For instance, some unauthorized actors may deposit standard paper, household items, or the like, into the ATM for deposit. Conventional ATM arrangements do not have the capability to evaluate items being deposited for validity in order to thwart unauthorized activity or mitigate impact of the unauthorized activity.

Accordingly, aspects described herein are directed to providing additional functionality at a self-service kiosk to detect and control unauthorized activity. In some arrangements, a catalogue of currency bills may be built. The catalogue of currency bills may include a database storing a unique identifier associated with each bills (e.g., a serial number), a denomination, a current and/or previous location, and the like. The catalogue of currency bills may receive input from a plurality of devices, channels, entities, and the like. For instance, a financial institution may input data for one or more currency bills by scanning bills deposited at a self-service kiosk, by scanning bills submitted for deposit to a banking associate, new bills received from a federal or governmental entity, and the like. In another example, a retail establishment may scan incoming and outgoing currency bills and the data may be transmitted to the database for storage. Accordingly, a database of currency bills in circulation may be established and maintained. This database may be used to detect unauthorized activity patterns, detect unauthorized activity, and the like.

Further, aspects described herein are directed to detecting occurrences of unauthorized activity quickly and efficiently and executing mitigating actions quickly and efficiently. For instance, by leveraging data contained in the catalogue of currency, unauthorized activity may be detected and controlled. For instance, a record of all bills within a self-service kiosk may be recorded (e.g., via the database storing the catalogue of currency). When bills are dispensed, the details associated with each bill may be captured and used to update the database. In arrangements in which a notification of error is received from a user, a scan of bills within the self-service kiosk may quickly confirm whether bills were or were not dispensed. Further, image data may be used to detect cash jams, capture actions or behaviors or an unauthorized actor, or the like.

In another example, items submitted for deposit may be evaluated by the self-service kiosk to confirm that they do not include metal, plastic, or other materials not associated with valid items. Additional security features such as watermarks, embedded threads, and the like, may be evaluated. If unauthorized activity is determined or detected based on the evaluation, one or more mitigating actions may be executed.

These and various other arrangements will be discussed more fully below.

Figure 1B:
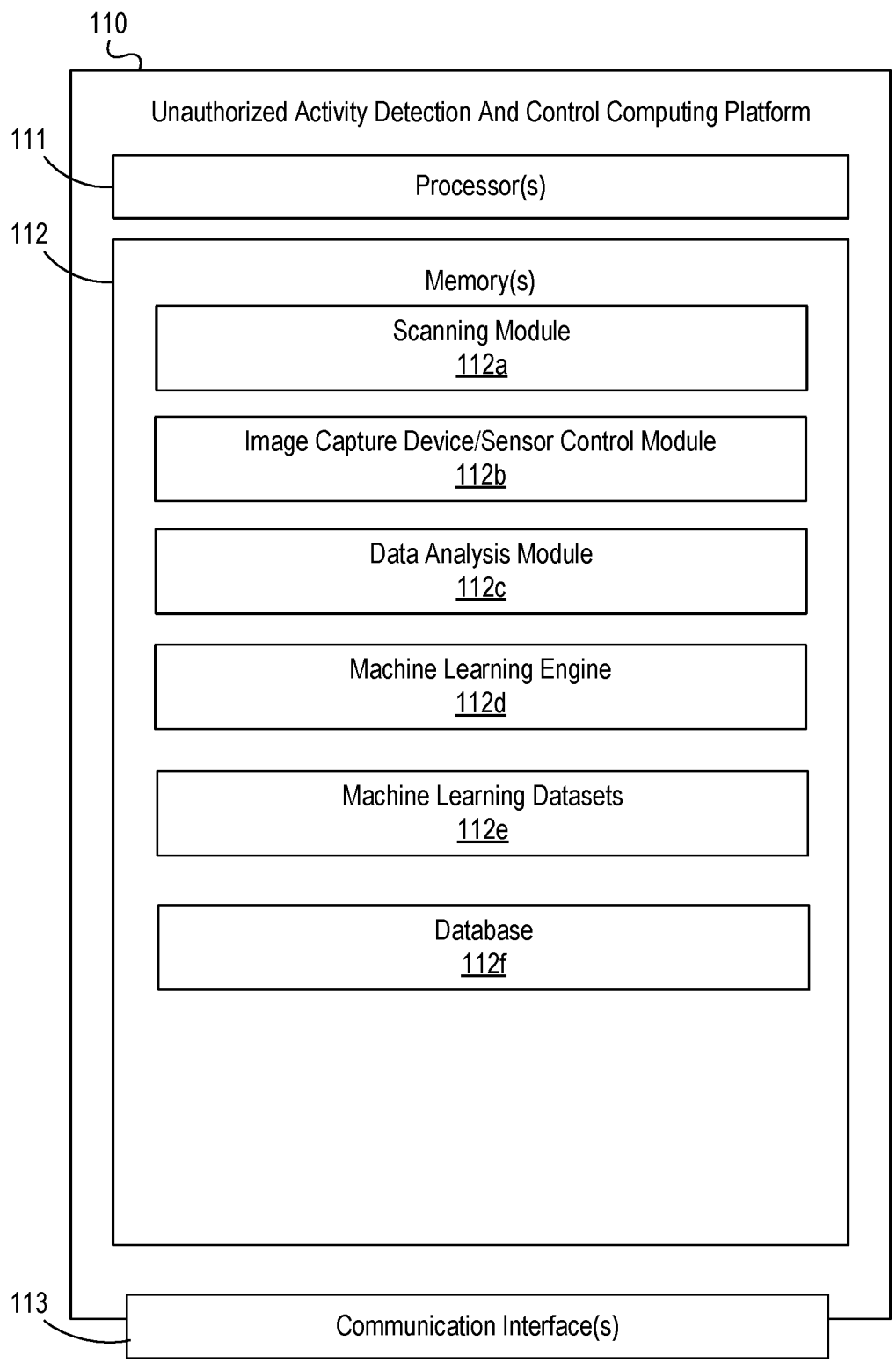

FIGS. 1A-1B depict an illustrative computing environment for implementing dynamic unauthorized activity detection and control functions in accordance with one or more aspects described herein. Referring to FIG. 1A, computing environment 100 may include one or more computing devices and/or other computing systems. For example, computing environment 100 may include unauthorized activity detection and control computing platform 110, self-service kiosk 120, internal computing system 2 125, external computing system 140, a first local user computing device 150, a second local user computing device 155, a first remote user computing device 170, and a second remote user computing device 175. Although one self-service kiosk 120 is shown, more self-service kiosks, as well as various types of self-service kiosks (e.g., automated teller machine (ATM), automated teller assistant (ATA), or the like), may be used without departing from the invention. Similarly, although one internal computing system 125, one external computing system 140, two local user computing devices 150, 155 and two remote user computing device 170, 175 are shown, more devices (or fewer devices in some cases) may be used without departing from the invention.

Unauthorized activity detection and control computing platform 110 may be configured to provide intelligent, dynamic, unauthorized activity detection and control functions. Unauthorized activity detection and control computing platform 110 may be a computer system that includes one or more computing devices (e.g., servers, server blades, or the like) and/or other computer components (e.g., processors, memories, communication interfaces) that may be used to implement machine learning algorithms, or the like to recognize patterns and generate or identify potential unauthorized activity, execute one or more mitigating actions, and the like.

For instance, unauthorized activity detection and control computing platform 110 may monitor user requested events (e.g., at a self-service kiosk, at a banking branch location, or the like) and may execute one or more functions to determine whether the event includes unauthorized activity. To facilitate evaluation of the events to determine whether they include unauthorized activity, a database of unique identifiers (e.g., serial numbers) associated with monetary or currency bills of various denominations may be built. Building the database may include scanning each currency bill as is received or dispensed by an entity, such as a financial institution, retail establishment, or the like, to determine the unique identifier, a denomination of the bill, a current location of the bill, and the like. A database event may then be generated and the information may be stored in the database. As bills are dispensed from the entity (e.g., via a banking associate event, self-service kiosk event, or the like), or as bills already registered in the database are detected subsequent times, the database event associated with that currency bill (e.g. based on the unique identifier) may be updated to indicate that the bill has been dispensed from the entity, has been received by another entity, or the like. In some examples, various entities (e.g., government entities, retail entities, financial institutions, and the like) may execute the scanning and storing process such that the database of bills and associated information and current location is robust. Accordingly, in an event of unauthorized activity (e.g., misappropriate of funds, or the like) historical information associated with particular bills may be retrieved from the database and used to assist in identifying the funds, identifying patterns of unauthorized activity, and the like.

Additionally or alternatively, in some arrangements, a self-service kiosk malfunction may cause requested funds to fail to be dispensed or only partially dispensed. Accordingly, the unique identifiers of the bills to be dispensed may be compared by, for example, the unauthorized activity detection and control computing platform, to bills remaining in the self-service kiosk to confirm whether a full amount was dispensed to a user and potential unauthorized activity is associated with a request to correct the issue, or whether the event was a device malfunction and a credit is owed to the user.

In still other examples, a self-service kiosk may evaluate funds or other objects submitted for deposit to confirm that the deposit includes valid items for deposit. For instance, deposited funds may be scanned to identify the unique identifier and denomination of each bill (e.g., via optical character recognition). Additionally or alternatively, each bill or other item received for deposit by the self-service kiosk may be evaluated by one or more sensors, image capture devices, or the like, to determine whether it includes metal, plastic, or other non-currency paper or fabric material that is not expected in a deposit of funds, to determine whether appropriate security measures, such as watermarks, ink color, embedded threads, and the like, are intact, and the like. This data may be used by the unauthorized activity detection and control computing platform 110 to detect potential unauthorized activity and identify and/or execute one or more mitigation actions to reduce or eliminate impact of the unauthorized activity (e.g., modifying functionality of the self-service kiosk, locking one or more user accounts, initiating or activating additional data or image capture devices to obtain additional information, and the like).

As discussed above, self-service kiosk may include any type of self-service kiosk, such as an ATM, ATA, or the like, and may form part of a same device as the unauthorized activity detection and control computing platform 110. Additionally or alternatively, a self-service kiosk and the unauthorized activity detection and control computing platform 110 may be physically separate devices that are in wired or wireless communication or are otherwise connected.

Internal computing system 125 may include one or more computing devices, systems, servers, computing platforms, or the like, internal to the enterprise or organization implementing the unauthorized activity detection and control computing platform 110. For instance, internal computing system 125 may include account information associated with a plurality of users or customers of the enterprise. In some examples, internal computing system 125 may execute one or more authentication functions associated with a user requesting an event or transaction at a self-service kiosk, or the like. Internal computing system 125 may host or execute one or more applications configured to execute events, such as requested transactions.

External computing system 140 may include one or more computing devices, systems, servers, computing platforms, or the like, that are external to the entity or enterprise organization implementing the unauthorized activity detection and control computing platform 110. For instance, external computing system 140 may be associated with another financial institution, retail establishment, or the like, and may communicate with unauthorized activity detection and control computing platform 110 to transmit and receive data associated with one or more bills being catalogued in the database. Additionally or alternatively, external computing system 140 may receive one or more notifications associated with potential unauthorized activity.

Local user computing device 1 150 and local user computing device 2 155 may be enterprise computing devices in communication with one or more other computing devices or systems. For instance, local user computing device 1 150 and/or local user computing device 2 155 may be computing devices configured to communicate with unauthorized activity detection and control computing platform 110 to receive and display one or more identified occurrences of unauthorized activity, information associated with the activity, and the like. In some examples, one or more of local user computing device 1 150 and/or local user computing device 2 155 may be computing devices associated with banking associates at a banking location or branch. Local user computing device 1 150 and/or local user computing device 2 155 may be used to facilitate capture of unique identifiers associated with bills being received by the enterprise, being dispensed by the enterprise, and the like. Local user computing device 1 150 and/or local user computing device 2 155 may further be computing devices configured to control parameters associated with aspects of unauthorized activity detection and control computing platform 110 (e.g., mitigation actions taken, notifications sent, or the like), may display one or more notifications, and the like. In some examples, local user computing device 1 150 and/or local user computing device 2 155 may further comprise a self-service kiosk.

Remote user computing device 1 170 and remote user computing device 2 175 may be computing devices associated with a user outside of the enterprise and may, in some examples, be user computing devices (e.g., desktop computers, laptop computers, tablet computers, smartphones, and the like) that may be used to, for instance, authenticate a user to a self-service kiosk (e.g., via multi-factor authentication, transmission of authentication data from the remote user computing device 1 170 and/or remote user computing device 2 175 to the self-service kiosk, or the like). In some examples, remote user computing device 1 170 and/or remote user computing device 2 175 may receive and display one or more notifications generate and/or transmitted by the unauthorized activity detection and control computing platform 110.

Computing environment 100 also may include one or more computing platforms. For example, and as noted above, computing environment 100 may include unauthorized activity detection and control computing platform 110. As illustrated in greater detail below, unauthorized activity detection and control computing platform 110 may include one or more computing devices configured to perform one or more of the functions described herein. For example, unauthorized activity detection and control computing platform 110 may include one or more computers (e.g., laptop computers, desktop computers, servers, server blades, or the like).

As mentioned above, computing environment 100 also may include one or more networks, which may interconnect one or more of unauthorized activity detection and control computing platform 110, self-service kiosk 120, internal computing system 125, external computing system 140, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization or enterprise (e.g., a corporation, financial institution, educational institution, governmental institution, or the like) and may interconnect one or more computing devices associated with the organization. For example, unauthorized activity detection and control computing platform 110, self-service kiosk 120, internal computing system 125, local user computing device 150, and local user computing device 155, may be associated with an organization or enterprise (e.g., a financial institution), and private network 190 may be associated with and/or operated by the organization, and may include one or more networks (e.g., LANs, WANs, virtual private networks (VPNs), or the like) that interconnect unauthorized activity detection and control computing platform 110, self-service kiosk 120, internal computing system 125, local user computing device 150, local user computing device 155, and one or more other computing devices and/or computer systems that are used by, operated by, and/or otherwise associated with the organization or enterprise. Public network 195 may connect private network 190 and/or one or more computing devices connected thereto (e.g., unauthorized activity detection and control computing platform 110, self-service kiosk 120, internal computing system 125, local user computing device 150, local user computing device 155) with one or more networks and/or computing devices that are not associated with the organization. For example, external computing system 140, remote user computing device 170, remote user computing device 175, might not be associated with an organization or enterprise that operates private network 190 (e.g., because external computing system 140, remote user computing device 170, and/or remote user computing device 175, may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect external computing system 140, remote user computing device 170, and/or remote user computing device 175, to private network 190 and/or one or more computing devices connected thereto (e.g., unauthorized activity detection and control computing platform 110, self-service kiosk 120, internal computing system 125, local user computing device 150, local user computing device 155). In some examples, unauthorized activity detection and control computing platform 110 may communicate with external computing system 140, remote user computing device 170, 175 (e.g., via public network 195) to receive and transmit unique identifier and additional data associated with one or more bills, transmit notifications, and the like.

Referring to FIG. 1B, unauthorized activity detection and control computing platform 110 may include one or more processors 111, memory 112, and communication interface 113. A data bus may interconnect processor(s) 111, memory 112, and communication interface 113. Communication interface 113 may be a network interface configured to support communication between unauthorized activity detection and control computing platform 110 and one or more networks (e.g., private network 190, public network 195, or the like). Memory 112 may include one or more program modules having instructions that when executed by processor(s) 111 cause unauthorized activity detection and control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of unauthorized activity detection and control computing platform 110 and/or by different computing devices that may form and/or otherwise make up unauthorized activity detection and control computing platform 110.

For example, memory 112 may have, store and/or include scanning module 112a. Scanning module 112a may store instructions and/or data that may cause or enable the unauthorized activity detection and control computing platform 110 to scan one or more bills, extract data (e.g., unique identifier, denomination, and the like) using, for example, optical character recognition, and transmit the scanned data, as well as additional data (e.g., location, time, date, and the like) for storage in, for example, database 112f. Scanning module 112a may also include instructions and/or data that may cause or enable the unauthorized activity detection and control computing platform 110 to scan or otherwise evaluate items inserted into a self-service kiosk for deposit to determine whether it is a valid deposit of funds. For instance, scanning module 112a may execute one or more scans to detect metal or other particles or materials not associated with valid currency, detect watermarks, embedded threads, and the like. In some arrangements, scanning module 112a may generate and transmit one or more instructions or commands to another computing device, such as self-service kiosk 120, local user computing device 150, local user computing device 155, to activate one or more scanning devices, image capture devices, metal detecting devices, and the like, and execute a data capture option via the scanning device or similar devices.

Unauthorized activity detection and control computing platform 110 may further have, store and/or include image capture device/sensor control module 112b. Image capture device/sensor control module 112b may store instructions and/or data that may activate or initiate operation of one or more image capture devices and/or sensors based on occurrence of a triggering event. For instance, if an object inserted into a self-service kiosk 120 includes metal or other materials not associated with valid currency, image capture device/sensor control module 112b may generate and/or transmit a signal to the self-service kiosk to activate or initiate operation of one or more additional image capture and/or sensing devices to capture additional data, images, video, and the like, associated with the deposit in an effort to evaluate the deposit for potential unauthorized activity, identify a user associated with the event, and the like.

Unauthorized activity detection and control computing platform 110 may further have, store and/or include data analysis module 112c. Data analysis module 112c may store instructions and/or data that may cause or enable unauthorized activity detection and control computing platform 110 to evaluate data received, determine whether unauthorized activity has occurred, identify one or more mitigation actions for execution, and the like. For instance, data analysis module 112c may analyze data received from one or more image capture, scanning devices, sensors, or the like, to determine whether a deposit includes valid currency bills. In another example, data analysis module 112c may compare unique identifiers of currency bills within a self-service kiosk to those designated as dispensed to determine whether the currency bills were, in fact, dispensed from the self-service kiosk or whether unauthorized activity has occurred.

In some example, data analysis module 112c may use machine learning to evaluate data received in order to detect unauthorized activity. Accordingly, unauthorized activity detection and control computing platform 110 may have, store and/or include a machine learning engine 112d and machine learning datasets 112e. Machine learning engine 112d may store instructions and/or data that may cause or enable unauthorized activity detection and control computing platform 110 to analyze data to identify patterns or sequences, e.g., based on and machine learning datasets 112e, within the data to determine or predict that unauthorized activity has occurred or may occur. For instance, if currency bills are obtained through unauthorized activity, machine learning may be used to detect what other currency bills were obtained based on, for example, the unique identifier associated with one or more bills, previously stored location data, and the like. In another example, because the scale of cataloguing and tracking currency bills of various denominations is overwhelming, machine learning may be used to track and predict locations of one or more bills, identify patterns that may indicate unauthorized activity (e.g., repeated requests for withdrawals of a same or similar amount in a particular geographic area, or the like). The machine learning datasets 112e may be generated based on analyzed data (e.g., data from previously received data, and the like), raw data, and/or received from one or more outside sources.

The machine learning engine 112d may receive data and, using one or more machine learning algorithms, may generate one or more machine learning datasets 112e. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention.

As indicated above, unauthorized activity detection and control computing platform 110 may further have, store and/or include database 112f. The database 112f may store data associated with a plurality of currency bills (e.g., a catalogue of bills in circulation) and may include a unique identifier associated with each bill (e.g., a serial number), a denomination of each bills, a current or previously identified location, an action data associated with each bill (e.g., when and where dispensed by a banking associate, a self-service kiosk, or the like). As new bills are received and scanned, the database may be modified to add or generate a new database event or entry to store data associated with the newly received bill.

Figure 2A:
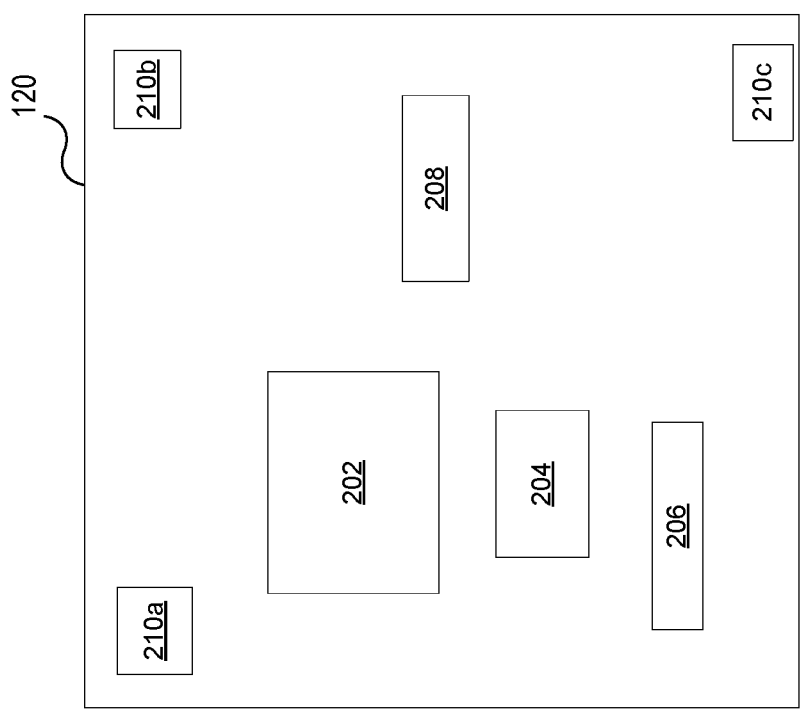

FIGS. 2A and 2B illustrate schematic views of one example self-service kiosk, such as an ATM, ATA, or the like. FIG. 2A illustrates one schematic view of an exterior of the self-service kiosk 120, while FIG. 2B is an interior view of self-service kiosk 120. The arrangement of components described with respect to FIGS. 2A and 2B is merely one arrangement and other arrangements of components, including more or fewer components, may be used without departing from the invention.

With reference to FIG. 2A, a schematic view of an exterior (e.g., front) of one example self-service kiosk 120 is shown. The self-service kiosk 120 may include a display 202 that may include a touch screen to enable user input. Additionally or alternatively, the self-service kiosk may include a keypad 204 or one or more other user input devices.

Self-service kiosk 120 may further include a dispensing device 206. Dispensing device 206 may include one or more slots and/retractable covers through which currency bills (and, in some examples, coins) are dispensed. Accordingly, when a user requests a withdrawal of an amount of funds, the funds may be dispensed to the user via the dispensing device 206.

Additionally or alternatively, self-service kiosk 120 may include one or more image capture and/or sensing devices 210. For instance, a plurality of image capture and/or sensing devices 210 may be distributed on or around the self-service kiosk 120 to capture images, video, and/or data associated with a user, requested event or transaction, or the like. Although three image capture and/or sensing devices 210a, 210b, and 210c are shown, more of fewer devices may be used without departing from the invention.

The image capture and/or sensing devices 210 may each be a same type of devices or may include different types of devices. For instance, one or more of the image capture and/or sensing devices 210 may include cameras (e.g., to capture one or more of still images and/or video images), motion sensors, light sensors, or the like. The image capture and/or sensing devices 210 may be continuously activated, may be activated upon detecting a user (e.g., via motion or the like), may be activated upon initiation of a transaction or event (e.g., a user inserting a card, entering a personal identification number, or the like), upon detecting a presence of a mobile device of a user, or the like. Additionally or alternatively, one or more of image capture and/or sensing devices 210a, 210b, 210c may be activated based on a triggering event (e.g., detection of a deposit including material not associated with valid currency, detection of a report of malfunction of the self-service kiosk, or the like). Further, in some arrangements, one or more of image capture and/or sensing devices 210a, 210b, 210c may continuously capture data and record the data. The data may be stored for a pre-determined time period (e.g., 24 hours, one week, or the like) to enable the system to retrieve data from a particular time period or event to determine whether unauthorized activity occurred.

Self-service kiosk 120 may also include a deposit slot or device 208. The deposit slot or device 208 may be configured to receive currency, checks, or the like, for deposit in the self-service kiosk 120 from a user. The deposit slot or device 208 may include an aperture extending from an exterior of the self-service kiosk 120 to an interior and items submitted via deposit slot 208 may be stored in an interior compartment of self-service kiosk 120.

FIG. 2B is a schematic of an interior of self-service kiosk 120. The self-service kiosk 120 may include a computing device, system, platform or the like 216. The computing device 216 may include one or more components similar to other computing devices described herein and may include processor to control operation of the self-service kiosk, receive instructions or commands from another computing device, system or platform, such as unauthorized activity detection and control computing platform 110, or the like. The computing device may include a memory storing one or more applications executing on the self-service kiosk.

Further, self-service kiosk may include a storage area or device 212. The storage area or device may include one storage portion or more than one portion storing different types of currency (e.g., bills vs. coins), storing different denominations of currency, storing currency received from a user, storing currency to be dispensed to a user, and the like. The storage portion 212 may include a scanning device 214a. The scanning device 214a may execute a scanning process on currency bills as they are received by the self-service kiosk (e.g., when funds are deposited by a user, when the self-service kiosk is replenished by a banking associate, or the like). The scanning device 214a may use optical character recognition to detect a unique identifier associated with each currency bill and/or a denomination of each currency bill. The scanning device 214a may transmit the data to the computing device 216 or directly to the unauthorized activity detection and control computing platform 110. The scanned data may be stored with additional data related to each bill, such as a current location of the bill (e.g., by self-service kiosk identifier), a time and date at which the bill was scanned at the current location, and the like.

In some examples, scanning device 214a may further include devices configured to evaluate items received for deposit by the self-service kiosk 120 to evaluate them to determine whether they include valid currency. For instance, scanning device 214a may include a scanning device to detect metals or other materials that are not associated with valid paper currency. Some unauthorized actors may insert metal objects into a deposit slot. When unauthorized activity of this nature occurs, the scanning device 214a may quickly identify the deposited items as invalid items for deposit (e.g., not valid currency, checks, or the like) and, based on the detected invalid items, one or more sensing devices may be activated, an account may be locked, functionality of the self-service kiosk 120 may be modified, or the like.

Sensing device 214a may also evaluate deposited items to determine whether appropriate watermarks exist on currency, whether embedded threads are present in expected locations, and the like, to verify that the currency is valid prior to crediting a user's account and, in many examples, while a user is present at the self-service kiosk 120 in order to capture additional information about the user (e.g., for use in detecting unauthorized activity and mitigating impact associated with the activity).

As discussed with respect to FIG. 2A, self-service kiosk 120 includes a dispensing device 206. Dispensing device 206 may extend from an interior of the self-service kiosk 120 to an exterior in order to dispense currency requested by a user. In some examples, another scanning device 214b may be positioned at or near the dispensing device 214b in order to capture data associated with bills being dispensed (e.g., unique identifier, denomination, date, time, and the like). This information may then be used to update the database entry associated with each bill to indicate that it was dispensed from the self-service kiosk 120.

In some examples, the scanning devices 214a and 214b may be used to scan bills within the self-service kiosk to determine whether a malfunction or error occurred in dispensing bills. For instance, if bills were selected for dispensing and were scanned by, for instance, scanning device 214b, if a malfunction or other error is reported, the self-service kiosk may scan bills near the dispensing device 206 and/or within storage area 212 to determine whether the bills were, in fact, dispensed and the report is unauthorized activity, or whether a malfunction did occur.

Interior of self-service kiosk 120 may further include a plurality of image capture and/or sensing devices 210d, 210e, and/or 210f. Although three devices are shown, more or fewer may be used without departing from the invention. Similar to the image capture and/or sensing devices 210a, 210b, and/or 210c arranged on the exterior of the self-service kiosk 120, image capture and/or sensing devices 210d, 210e, 210f may be distributed on or around the interior of the self-service kiosk 120 to capture images, video, and/or data associated with currency within the self-service kiosk, items submitted for deposit, and the like. Although three image capture and/or sensing devices 210d, 210e, and 210f are shown, more of fewer devices may be used without departing from the invention.

The image capture and/or sensing devices 210d, 210e, 210f may each be a same type of devices or may include different types of devices. For instance, one or more of the image capture and/or sensing devices 210d, 210e, 210f may include cameras (e.g., to capture one or more of still images and/or video images), motion sensors, light sensors, or the like. The image capture and/or sensing devices 210d, 210e, 210f may be continuously activated, may be activated upon detecting a user (e.g., via motion or the like), may be activated upon initiation of a transaction or event (e.g., a user inserting a card, entering a personal identification number, or the like), upon detecting a presence of a mobile device of a user, or the like. Additionally or alternatively, one or more of image capture and/or sensing devices 210d, 210e, 210f may be activated based on a triggering event (e.g., detection of a deposit including material not associated with valid currency, detection of a report of malfunction of the self-service kiosk, or the like). Further, in some arrangements, one or more of image capture and/or sensing devices 210d, 210e, 210f may continuously capture data and record the data. The data may be stored for a pre-determined time period (e.g., 24 hours, one week, or the like) to enable the system to retrieve data from a particular time period or event to determine whether unauthorized activity occurred.

In some arrangements, image capture and/or sensing devices 210d, 210e, 210f may also detect or evaluate features of items submitted for deposit (e.g., in conjunction with or instead of scanning device 214a). For instance, image capture and/or sensing devices 210d, 210e, 210f may include metal detection capabilities, and the like, to evaluate items submitted for deposit.

Figure 3B:
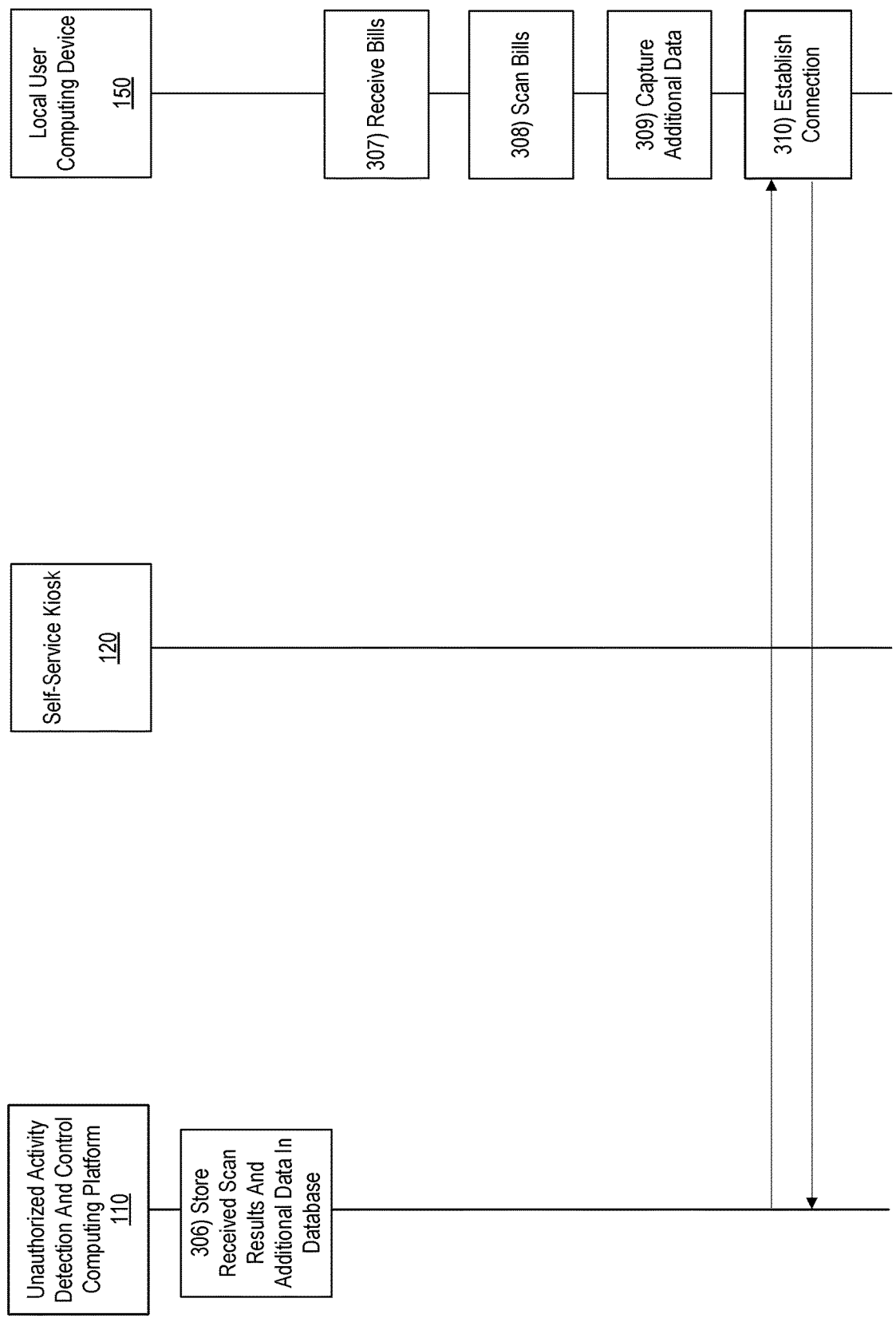
Figure 3C:
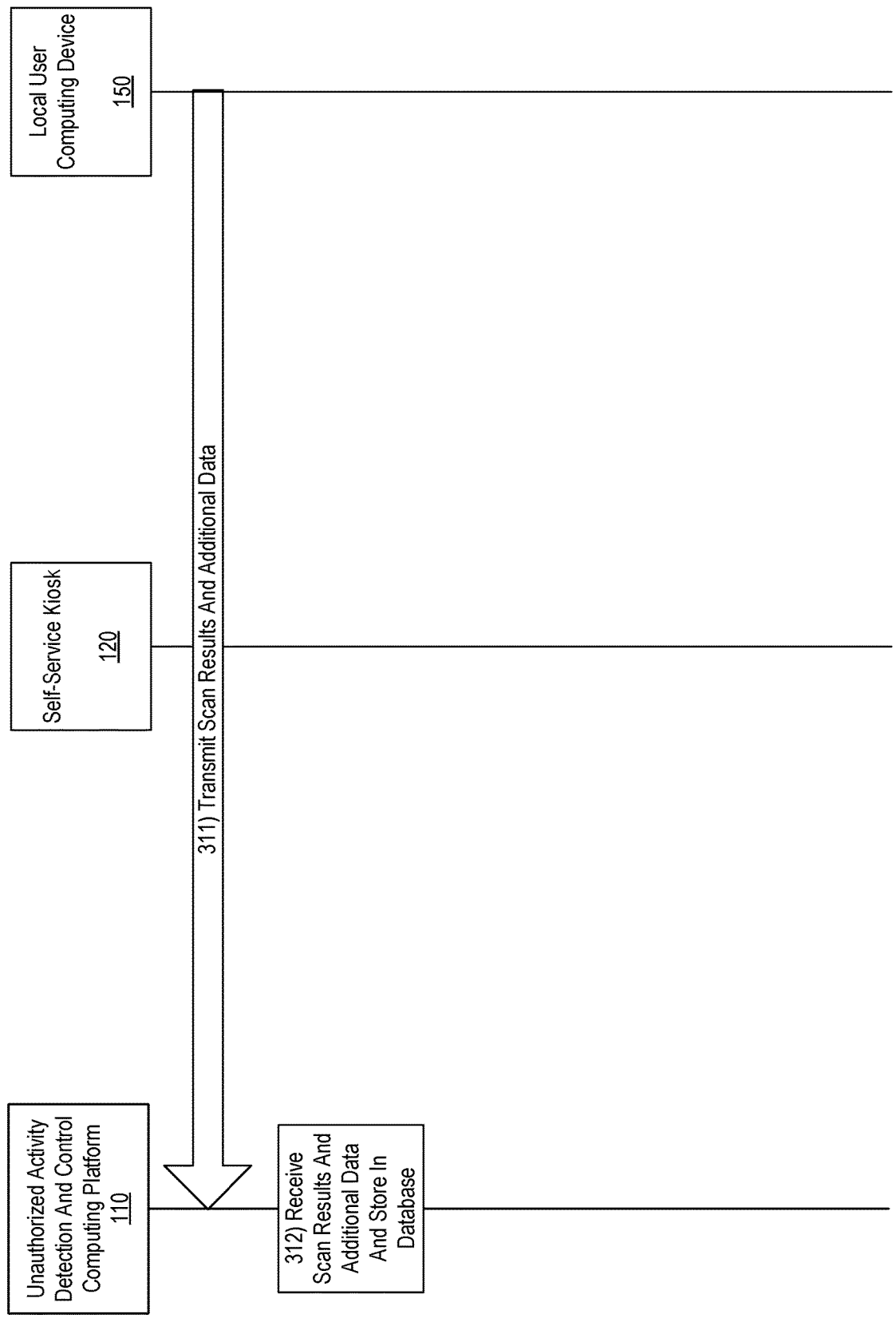

FIGS. 3A-3C depict one example illustrative event sequence for generating a currency catalogue for use in detecting and controlling unauthorized activity in accordance with one or more aspects described herein. The events shown in the illustrative event sequence are merely one example sequence and additional events may be added, or events may be omitted, without departing from the invention.

With reference to FIG. 3A, at step 301, currency bills may be received by, for example, a self-service kiosk 120. Currency bills of various denominations may be received (e.g., via deposits from users) at a plurality of self-service kiosks. In response to receiving the bills, the bills may be scanned at step 302. For instance, optical character recognition may be used to identify and capture a unique identifier (e.g., serial number) associated with each bill and/or a denomination of each bill. In some examples, the scanned bills may also be evaluated to determine whether they are valid currency (e.g., do not include metal or other materials not associated with valid currency, include appropriate watermarks and/or embedded threads, include proper ink and/or coloring, and the like).

At step 303, additional data associated with each bill may be captured. For instance, a location of the self-service kiosk 120 at which the bill was received, a date, a time, and the like, may be captured and associated with each bill.

At step 304, a connection may be established between the self-service kiosk 120 and the unauthorized activity detection and control computing platform 110. For instance, a first wireless connection may be established between the unauthorized activity detection and control computing platform 110 and self-service kiosk 120. Upon establishing the first wireless connection, a communication session may be initiated between unauthorized activity detection and control computing platform 110 and self-service kiosk 120.

At step 305, results of the scan and the additional data may be transmitted from the self-service kiosk 120 to the unauthorized activity detection and control computing platform 110. For instance, results of the scan (e.g., unique identifier, denomination, and the like), as well as the captured additional information (e.g., location, date, time, and the like) may be used to generate current bill data that may be transmitted from the self-service kiosk 120 to the unauthorized activity detection and control computing platform 110 (e.g., during the communication session initiated upon establishing the first wireless connection.

With reference to FIG. 3B, at step 306, the current bill data, including the scan results and additional information, may be received by the unauthorized activity detection and control computing platform 110 and stored in a database. For instance, a database structure may be modified to add an additional event including the identified bill, and the like. In some examples, if the bill was previously scanned and stored, a new entry might not be created and, instead, the additional data (e.g., location, time, date, and the like) may be used to update the previous database entry. In some examples, updating the previous database entry may include overwriting previous additional data elements to reflect the current data. In other examples, the additional data may be cumulative (e.g., additional data elements may be associated with the bill) to provide tracking of previous locations of a bill (e.g., the circulation route of the bill).

At step 307, currency bills may be received by, for example, a banking location, such as via an event or transaction conducted by a banking associate via local user computing device 150. Currency bills of various denominations may be received (e.g., via deposits from users) at a plurality of local user computing devices associated with a plurality of banking associates at a plurality of banking locations.

In response to receiving the bills, the bills may be scanned at step 308. For instance, optical character recognition may be used to identify and capture a unique identifier (e.g., serial number) associated with each bill and/or a denomination of each bill. In some examples, the scanned bills may also be evaluated to determine whether they are valid currency (e.g., include appropriate watermarks and/or embedded threads, include proper ink and/or coloring, and the like).

At step 309, additional data associated with each bill may be captured. For instance, a banking location of the banking associated and associated local user computing device 150 at which the bill was received, a date, a time, and the like, may be captured and associated with each bill.

At step 310, a connection may be established between the local user computing device 150 and the unauthorized activity detection and control computing platform 110. For instance, a second wireless connection may be established between the unauthorized activity detection and control computing platform 110 and local user computing device 150. Upon establishing the second wireless connection, a communication session may be initiated between unauthorized activity detection and control computing platform 110 and local user computing device 150.

With reference to FIG. 3C, at step 311, results of the scan and the additional data may be transmitted from the local user computing device 150 to the unauthorized activity detection and control computing platform 110. For instance, results of the scan (e.g., unique identifier, denomination, and the like), as well as the captured additional information (e.g., location, date, time, and the like) may be used to generate current bill data that may be transmitted from local user computing device 150 to the unauthorized activity detection and control computing platform 110 (e.g., during the communication session initiated upon establishing the second wireless connection.

At step 312, the current bill data, including the scan results and additional information, may be received by the unauthorized activity detection and control computing platform 110 and stored in a database. For instance, a database structure may be modified to add an additional event including the identified bill, and the like. In some examples, if the bill was previously scanned and stored, a new entry might not be created and, instead, the additional data (e.g., location, time, date, and the like) may be used to update the previous database entry. In some examples, updating the previous database entry may include overwriting previous additional data elements to reflect the current data. In other examples, the additional data may be cumulative (e.g., additional data elements may be associated with the bill) to provide tracking of previous locations of a bill (e.g., the circulation route of the bill).

FIGS. 4A-4G depict one example illustrative event sequence for dynamically detecting unauthorized activity in accordance with one or more aspects described herein. The events shown in the illustrative event sequence are merely one example sequence and additional events may be added, or events may be omitted, without departing from the invention.

At step 401, a request for access may be received by, for example, a self-service kiosk 120, such as an ATM, ATA or the like. In some examples, the request for access may include detecting a presence of a user at the self-service kiosk 120 (e.g., based on detection of a signal associated with a mobile device of the user, detecting motion of a user via a motion sensor, or the like), and/or may include receiving, for example, user input requesting the event, such as inserting a card into the self-service kiosk 120. The request for access may prompt one or more authentication processes to execute.

At step 402, authentication information may be received from the user. For instance, a user may input a password, personal identification number (PIN), biometric data, or the like. The authentication information may be provided via a user input device on the self-service kiosk 120 and/or via a mobile device of the user, such as remote user computing device 170.

At step 403, a connection may be established between self-service kiosk 120 and internal computing system 125. For instance, a first wireless connection may be established between internal computing system 125 and self-service kiosk 120. Upon establishing the first wireless connection, a communication session may be initiated between internal computing system 125 and self-service kiosk 120.

At step 404, the received authentication data may be transmitted from the self-service kiosk 120 to internal computing system 125 for verification. At step 405, the authentication data may be received by internal computing system 125 and processed. For instance, processing the authentication data may include comparing the received authentication data to pre-stored authentication data associated with a user (e.g., based on a card inserted into self-service kiosk 120, based on a mobile device detected, or the like).

Figure 4A:
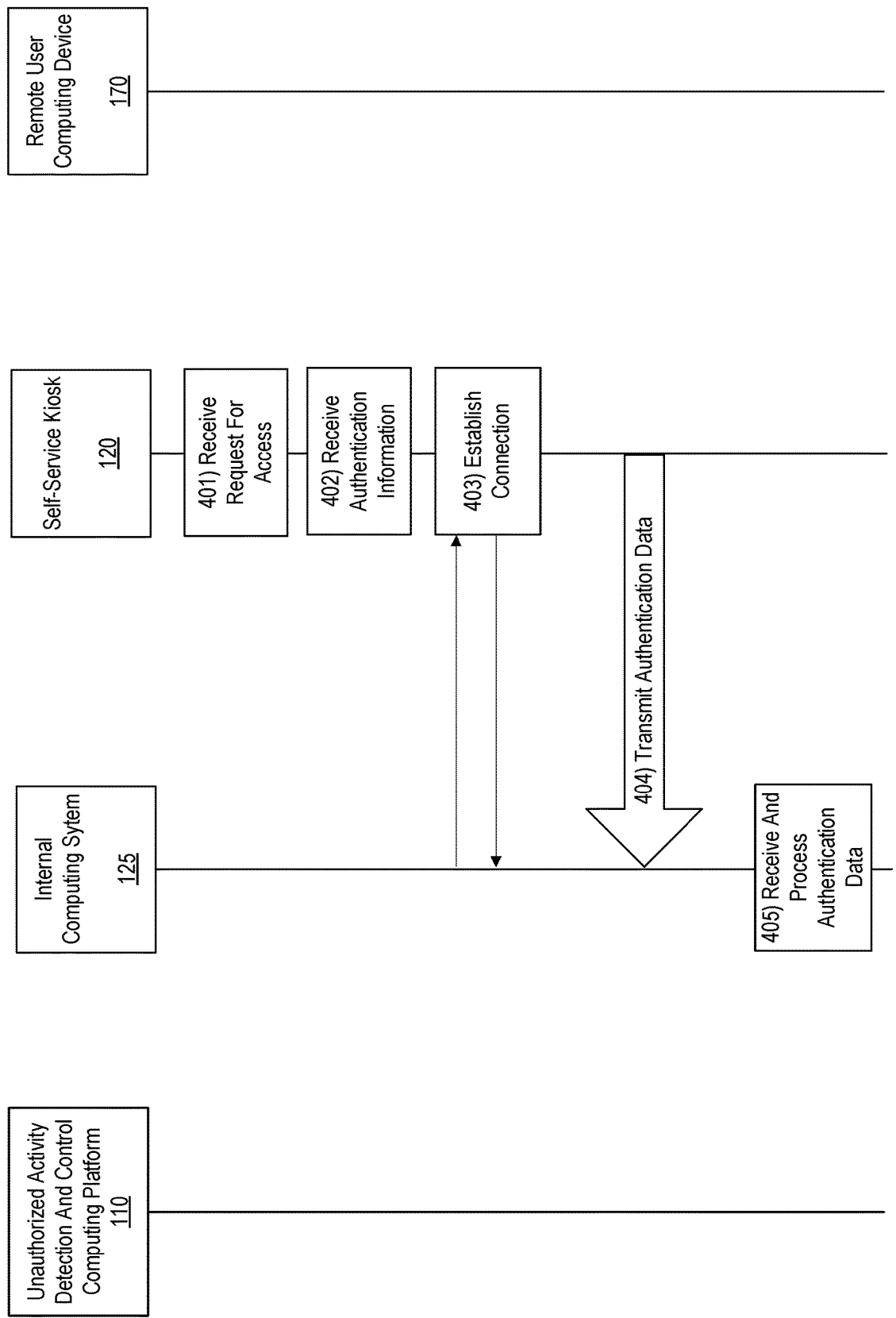
FIGS. 4A-4G depict an illustrative event sequence for implementing dynamic unauthorized activity detection and control functions in accordance with one or more aspects described herein.
Figure 4B:
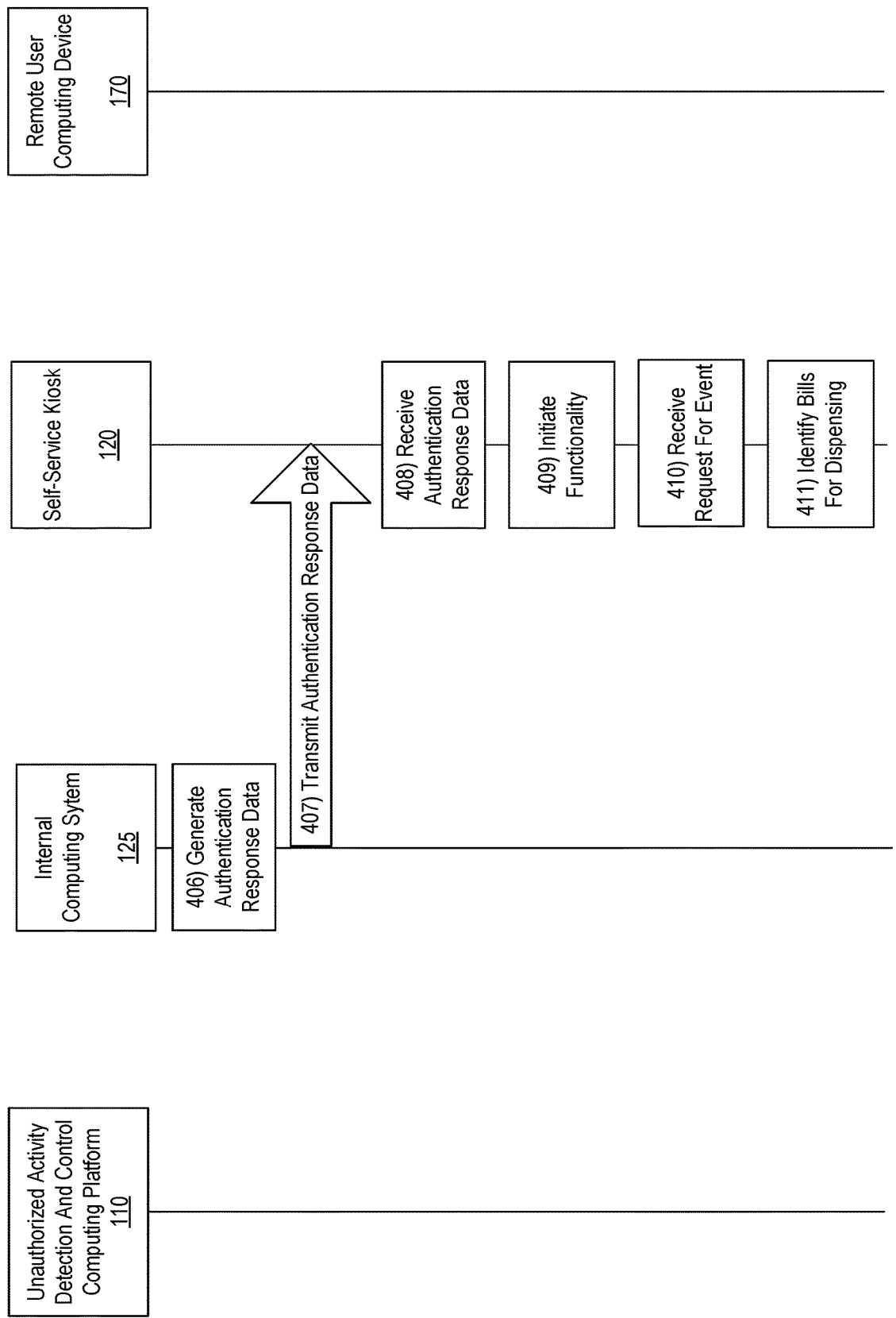

With reference to FIG. 4B, at step 406, the internal computing system 125 may generate authentication response data based on the processing performed at step 405. For instance, if the authentication data received does not match pre-stored data, authentication response data denying the requested event or transaction may be generated. Alternatively, if the received authentication data matches the pre-stored data, authentication response data authenticating the user may be generated.

At step 407, the authentication response data may be transmitted from the internal computing system 125 to the self-service kiosk 120. At step 408, the authentication response data may be received by the self-service kiosk 120.

At step 409, if the authentication response data authenticates the user, functionality associated with the self-service kiosk 120 may be initiated, activated or enabled. For instance, event or transaction processing functions may be initiated, activated or enabled based on the user being authenticated.

At step 410, a request for an event or transaction may be received by the self-service kiosk 120. For instance, user input may be received by the self-service kiosk 120 requesting processing of one or more events or transactions. In some examples, the request for an event or transaction may include a withdrawal request including a request for withdrawal of currency funds including one or more currency bills from the self-service kiosk 120 and corresponding to a modification or adjustment to a user account (e.g., a debit from the user's account may be made based on the requested withdrawal amount).

At step 411, one or more bills for dispensing may be identified. For instance, the self-service kiosk 120 may store a plurality of bills for dispensing. As discussed herein, the bills may be scanned and catalogued such that a location of the bills in the self-service kiosk 120 is stored in a database. When a request for a withdrawal is received, one or more bills corresponding to a requested amount of the withdrawal may be identified for dispensing. In identifying the bills, the bills may be scanned or otherwise detected by the self-service kiosk 120 as being dispensed. Scanning the bills may include capturing the unique identifier and/or denomination, as well as capturing additional information such as the date, time and/or location associated with dispensing the bills.

Figure 4C:
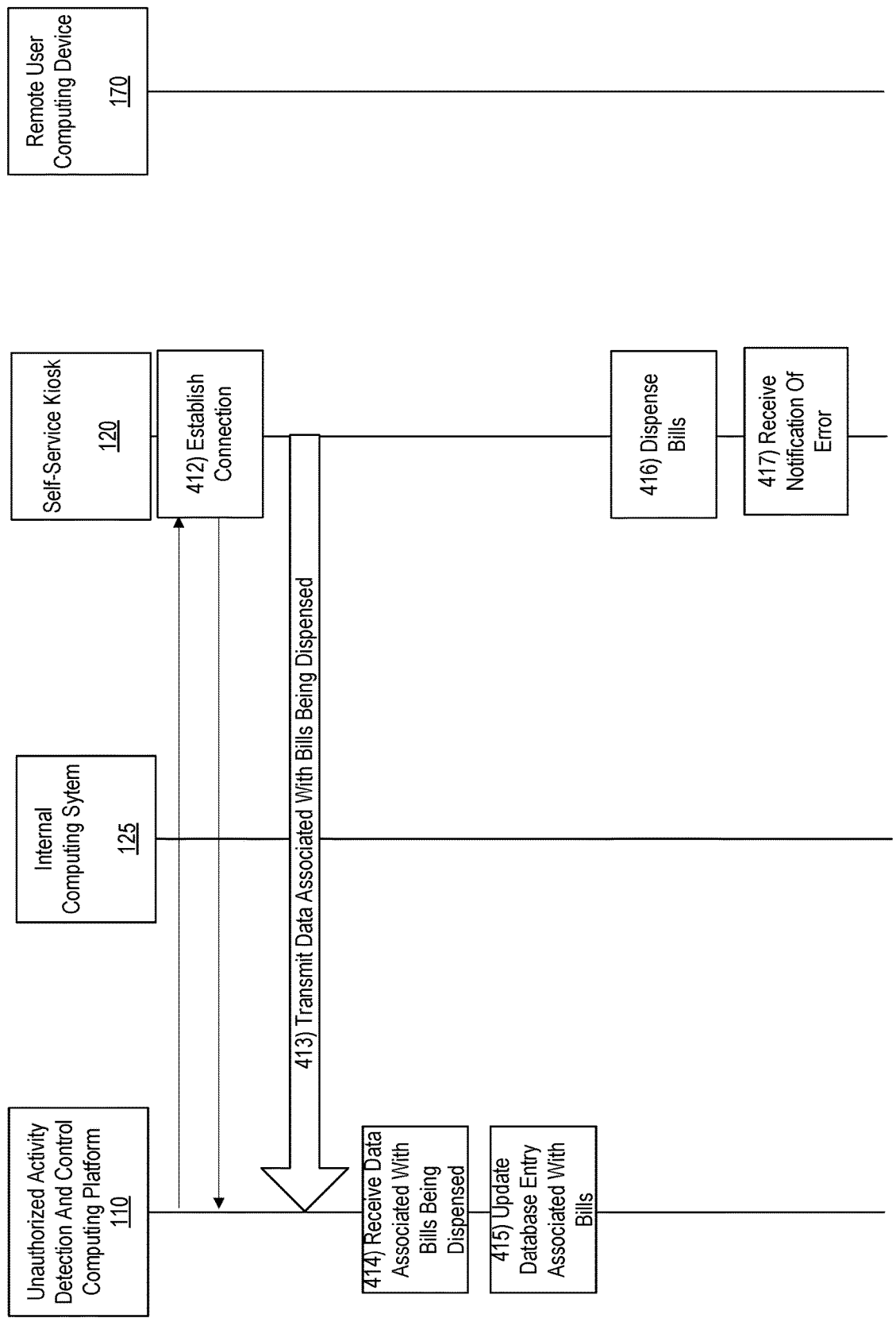

With reference to FIG. 4C, at step 412, a connection may be established between self-service kiosk 120 and unauthorized activity detection and control computing platform 110. For instance, a second wireless connection may be established between unauthorized activity detection and control computing platform 110 and self-service kiosk 120. Upon establishing the second wireless connection, a communication session may be initiated between unauthorized activity detection and control computing platform 110 and self-service kiosk 120.

At step 413, data associated with the bills being dispensed may be transmitted from the self-service kiosk 120 to the unauthorized activity detection and control computing platform 110. For instance, data associated with the unique identifier and/or denomination of the bills, and/or additional information captured, may be transmitted from the self-service kiosk 120 to the unauthorized activity detection and control computing platform 110. In some examples, the data may be transmitted during the communication session initiated upon establishing the second wireless connection.

At step 414, the data associated with the bills being dispensed may be received and, at step 415, the data may be processed to update one or more database entries associated with each bill being dispensed. For instance, the unique identifier associated with each bill being dispensed may be used as a query to identify database entries associated with each bill. Data elements associated with the database entry may then be modified or updated to include the data associated with dispensing the bills.

At step 416, the bills may be dispensed by the self-service kiosk 120. For instance, the bills may be transferred from the storage area of self-service kiosk 120 to the dispensing device and dispensed to the requesting user.

At step 417, a notification of error may be received by the self-service kiosk 120. For instance, in some examples, a malfunction of the self-service kiosk 120 may occur and bills indicated as dispensed might not actually be dispensed to the user. In another example, a different amount of funds than the requested amount may be dispensed to the user. Accordingly, in these arrangements, the user may provide user input to the self-service kiosk 120 (or other enterprise unit) of the malfunction. However, in some examples, unauthorized users, or users executing unauthorized activity, may indicate that an error has occurred when, in fact, the correct amount was dispensed.

Figure 4D:
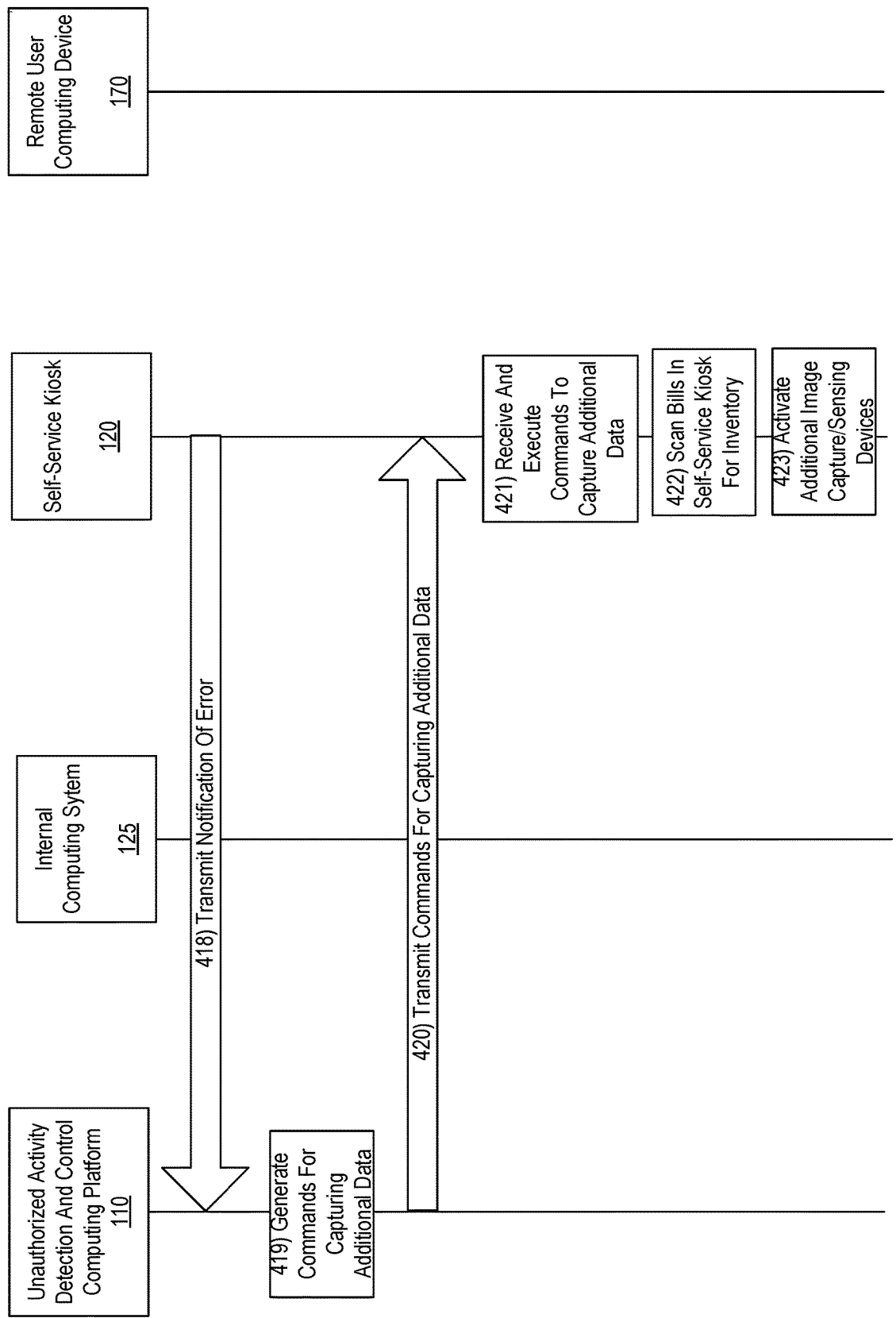

With reference to FIG. 4D, at step 418, the received notification of error may be transmitted from the self-service kiosk 120 to the unauthorized activity detection and control computing platform 110. In some examples, the notification of error may be transmitted during the communication session initiated upon establishing the second wireless connection. In other examples, another wireless connection may be established and another communication session may be initiated.

At step 419, one or more instructions or commands for capturing additional data may be generated. For instance, based on the notification of error, which may include additional details about a type of error, or the like, one or more instructions or commands to capture additional data may be generated by the unauthorized activity detection and control computing platform 110. In some examples, the instructions for capturing additional data may include an instruction to transmit, from one or more image capture and/or sensing devices at the self-service kiosk 120, data, such as image data, video data, and the like. Additionally or alternatively, the one or more instructions or commands may include an instruction or command to activate one or more additional image capture and/or sensing devices and transmit the captured data from additional image capture/sensing device of the self-service kiosk 120 to the unauthorized activity detection and control computing platform 110. In some arrangements, this may include activating recording and/or image capture associated with one or more devices on an exterior of the self-service kiosk 120 and/or one or more devices on an interior of the self-service kiosk. In some arrangements, the instruction or command may include an instruction to scan all bills within the self-service kiosk 120 in order to inventory the bills remaining in the self-service kiosk. The unauthorized activity detection and control computing platform 110 may then search for the unique identifier associated with the bills identified as dispensed. If the bills are detected during the scan, the self-service kiosk 120 may have malfunctioned. If the bills are not detected, the bills may have been dispensed and the notification of error may include unauthorized activity.

At step 420, the commands or instructions to capture additional data may be transmitted from the unauthorized activity detection and control computing platform 110 to the self-service kiosk 120. In some examples, the generated instructions or commands may be transmitted during the communication session initiated upon establishing the second wireless connection. In other examples, another wireless connection may be established and another communication session may be initiated.

At step 421, the commands or instructions to capture additional information may be received by the self-service kiosk 120 and executed. For instance, at step 422, an instruction or command to scan bills within the self-service kiosk 120 may be executed. As discussed, the bills within the self-service kiosk 120 may be scanned to perform an inventory. As described herein, the inventory may be used to confirm with the bills identified as dispensed we actually dispensed or whether an error occurred.

In another example, at step 423, an instruction or command to activate one or more additional image capture and/or sensing devices may be executed. For instance, one or more additional image capture and/or sensing devices located on an interior or exterior of the self-service kiosk 120 may be activated. In some examples, activating devices on an exterior of the self-service kiosk 120 may aid in capturing images or behavior of the user to determine whether unauthorized activity has occurred or is occurring, to aid in identifying the user executing the unauthorized activity (e.g., in cases where the user may be authenticated using credentials obtained through unauthorized activity, or the like). In some examples, image capture and/or sensing devices on an interior of the self-service kiosk 120 may be activated in order to determine whether a jam occurred in one or more systems of the self-service kiosk (e.g., in transfer from the storage area to the dispensing device), whether bills are stuck in a dispensing device, or the like. In some examples, image capture devices may include one or more of still and/or video images. Sensing devices may include one or more of pressure sensing devices, motion detecting devices, and the like.

Figure 4E:
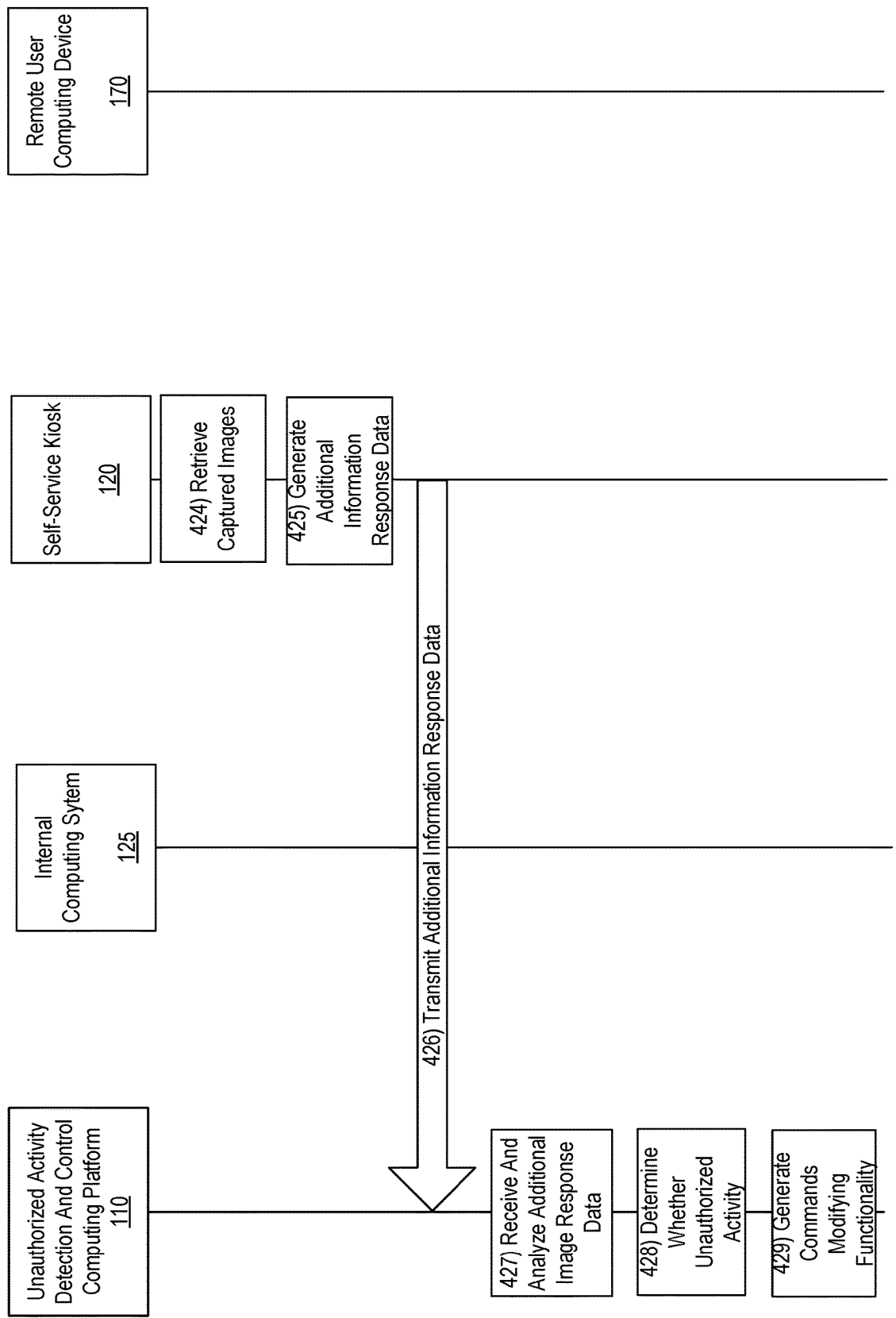

With reference to FIG. 4E, in another example, at step 424, an instruction or command to retrieve captured images may be executed. For instance, self-service kiosk 120 may have one or more image capture devices that may continuously capture image data, may automatically activate upon detecting a user, or the like. Images captured by these devices may be retrieved based on the instruction executed.

Although this example includes execution of instructions to retrieve images, scan bills and activate additional devices, in some examples, fewer instructions or commands may be generated or executed. Further, in some examples, machine learning may be used to identify particular instructions or commands to generate and execute. For instance, based on details of the error received, machine learning may be used to identify patterns in data in order to identify particular instructions for generation or execution in order to efficiently obtain information to detect unauthorized activity.

At step 425, additional information response data may be generated. For instance, results of any instructions or commands executed by the self-service kiosk 120 may be used to generate additional information response data. Accordingly, the additional information response data may include retrieved images, images captured by newly activated devices, results of the scan of bills, and the like.

At step 426, the additional information response data may be transmitted from the self-service kiosk 120 to the unauthorized activity detection and control computing platform 110. In some examples, the additional information response data may be transmitted during the communications session initiated upon establishing the second wireless connection. In other examples, another wireless connection may be established and another communication session may be initiated.

At step 427, the additional information response data may be received by the unauthorized activity detection and control computing platform 110 and analyzed. For instance, results of the inventory scan may be analyzed to determine whether, based on the unique identifier, the bills identified as dispensed are still within the self-service kiosk 120. Additionally or alternatively, images may be analyzed to determine whether a jam has occurred (e.g., in transfer between storage and dispensing, at the dispensing device, or the like).

At step 428, based on the analysis of the additional information response data, the unauthorized activity detection and control computing platform 110 may determine whether unauthorized activity occurred. For instance, based on the inventory scan results, analysis of image data, and the like, a determination may be made as to whether unauthorized activity occurred or whether an error or malfunction occurred.

At step 429, based on the determination, one or more instructions or commands modifying functionality of the self-service kiosk 120 may be generated. For instance, if an error or malfunction occurred, one or more functions or features provided by the self-service kiosk 120 may be disabled until the malfunction may be corrected. Accordingly, an instruction or command to disable one or more functions may be generated. In another example, if unauthorized activity occurred, functionality available to the user at the self-service kiosk 120 (e.g., the user who may have executed the unauthorized activity) may be modified (e.g., deposits only, withdrawals, balance transfers or the like may be disabled). Various other example functionality modifications may be generated without departing from the invention.

Figure 4F:
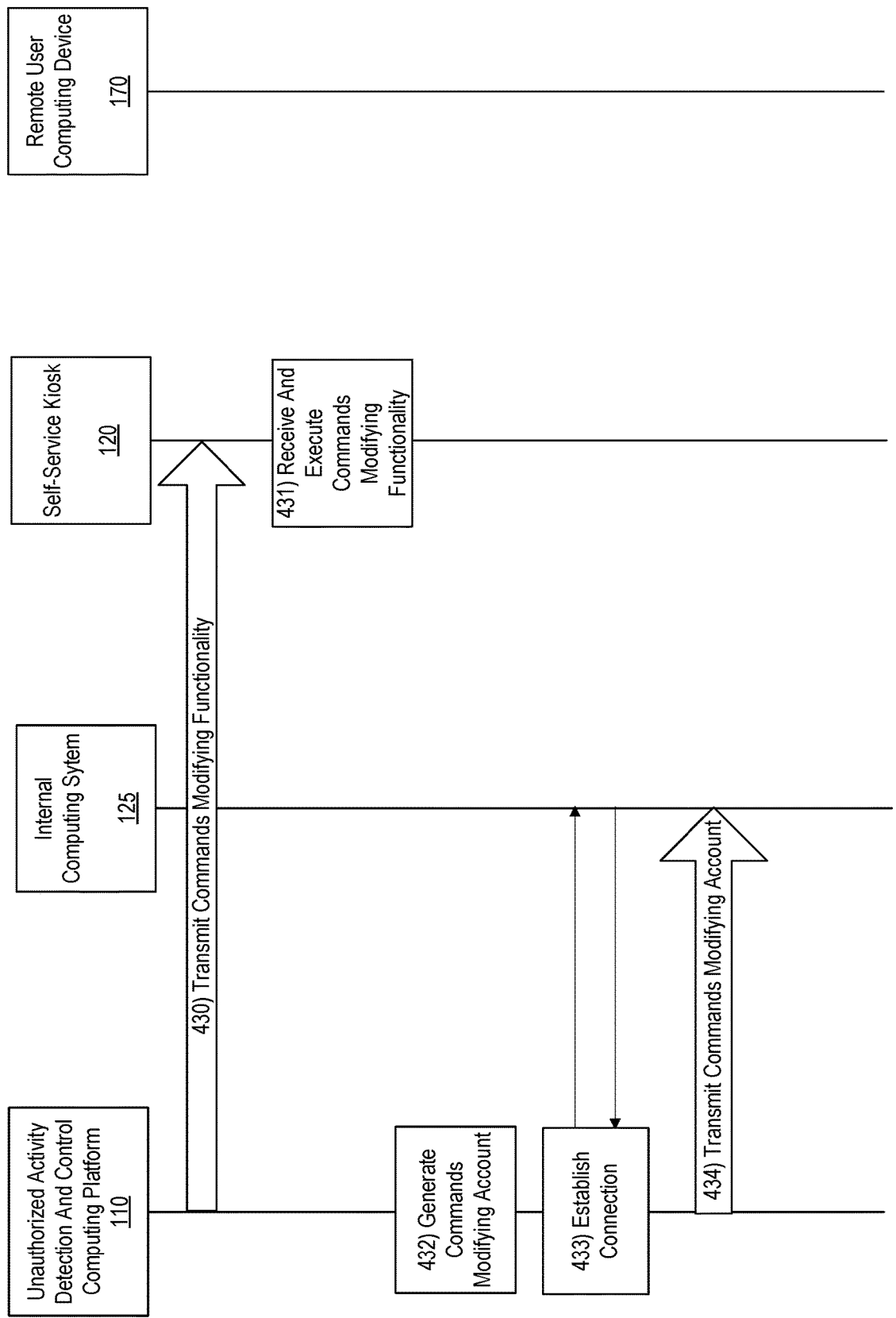

With reference to FIG. 4F, at step 430, the commands or instructions modifying functionality of the self-service kiosk 120 may be transmitted from the unauthorized activity detection and control computing platform 110 to the self-service kiosk 120. At step 431, the generated commands or instructions may be received by the self-service kiosk 120 and executed. Executing the commands may include modifying the functionality of the self-service kiosk 120 as outlined in the instructions or commands.

At step 432, based on the analysis performed at step 427, one or more instructions modifying an account of the user may be generated. For instance, if unauthorized activity is determined, a command or instruction locking the account associated with the user may be generated. In another example, if an error or malfunction occurred, an instruction or command to credit the account of the user in the amount that was indicated as dispensed but was not dispensed because of the error may be generated. Various other instructions or commands modifying one or more aspects associated with an account of the user may be generated without departing from the invention.

At step 433, a connection may be established between unauthorized activity detection and control computing platform 110 and internal computing system 125. For instance, a third wireless connection may be established between unauthorized activity detection and control computing platform 110 and internal computing system 125. Upon establishing the third wireless connection, a communication session may be initiated between unauthorized activity detection and control computing platform 110 and internal computing system 125.

At step 434, the generated one or more commands or instructions modifying an account may be transmitted from the unauthorized activity detection and control computing platform 110 to the internal computing system 125. The instructions or commands may be transmitted during the communication session initiated upon establishing the third wireless connection.

Figure 4G:
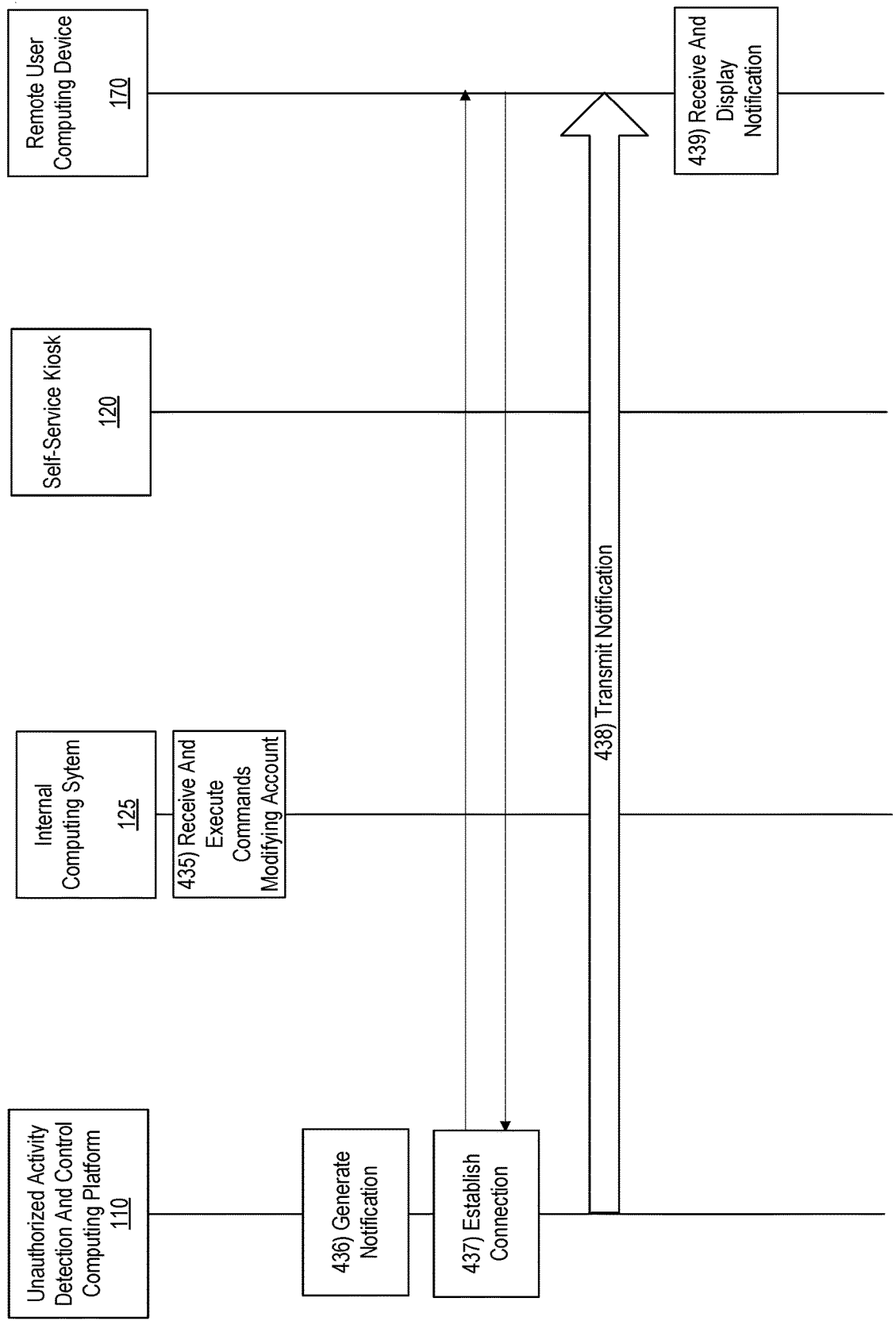

With reference to FIG. 4G, at step 435, the generated one or more commands or instructions to modify an account may be received by the internal computing system 125 and executed. Executing the one or more commands or instructions may include modifying one or more aspects associated with the account (e.g., modifying a balance, modifying authentication requirements, locking the account, or the like).

At step 436, one or more notifications may be generated. For instance, a notification indicating that unauthorized activity has occurred and additional action should be taken may be generated and transmitted to one or more computing devices. In some examples, law enforcement may be notified of the unauthorized activity. In another example, a notification of an error and/or associated modifications to a user account may be generated. Various other notifications may be generated without departing from the invention.

At step 437, a connection may be established between unauthorized activity detection and control computing platform 110 and remote user computing device 170. For instance, a fourth wireless connection may be established between unauthorized activity detection and control computing platform 110 and remote user computing device 170. Upon establishing the fourth wireless connection, a communication session may be initiated between unauthorized activity detection and control computing platform 110 and remote user computing device.

At step 438, the generated notification may be transmitted from the unauthorized activity detection and control computing platform 110 to, for instance, remote user computing device 170. For instance, if the generated notification includes information related to the user account, the notification may be transmitted to the remote user computing device 170 of the user. The notification may be transmitted during the communication session initiated upon establishing the fourth wireless connection.

Although the example shown in FIG. 4G illustrates a notification being sent to remote user computing device 170, in some examples, a notification may be transmitted to local user computing device 150 associated with a user of the account in addition to or in lieu or sending this notification. In some examples, the device to which the notification is transmitted may be based on whether unauthorized activity was identified or not.

At step 439, the generated notification may be received by the remote user computing device 170 and displayed on a display of the remote user computing device 170.

FIGS. 5A-5G depict another example illustrative event sequence for dynamically detecting unauthorized activity in accordance with one or more aspects described herein. The events shown in the illustrative event sequence are merely one example sequence and additional events may be added, or events may be omitted, without departing from the invention.

Similar to some aspects discussed with respect to FIGS. 4A-4G, at step 501, a request for access may be received by, for example, a self-service kiosk 120, such as an ATM, ATA or the like. In some examples, the request for access may include detecting a presence of a user at the self-service kiosk 120 (e.g., based on detection of a signal associated with a mobile device of the user, detecting motion of a user via a motion sensor, or the like), and/or may include receiving, for example, user input requesting the event, such as inserting a card into the self-service kiosk 120. The request for access may prompt one or more authentication processes to execute.

At step 502, authentication information may be received from the user. For instance, a user may input a password, personal identification number (PIN), biometric data, or the like. The authentication information may be provided via a user input device on the self-service kiosk 120 and/or via a mobile device of the user, such as remote user computing device 170.

At step 503, a connection may be established between self-service kiosk 120 and internal computing system 125. For instance, a first wireless connection may be established between internal computing system 125 and self-service kiosk 120. Upon establishing the first wireless connection, a communication session may be initiated between internal computing system 125 and self-service kiosk 120.

At step 504, the received authentication data may be transmitted from the self-service kiosk 120 to internal computing system 125 for verification. At step 505, the authentication data may be received by internal computing system 125 and processed. For instance, processing the authentication data may include comparing the received authentication data to pre-stored authentication data associated with a user (e.g., based on a card inserted into self-service kiosk 120, based on a mobile device detected, or the like).

Figure 5A:
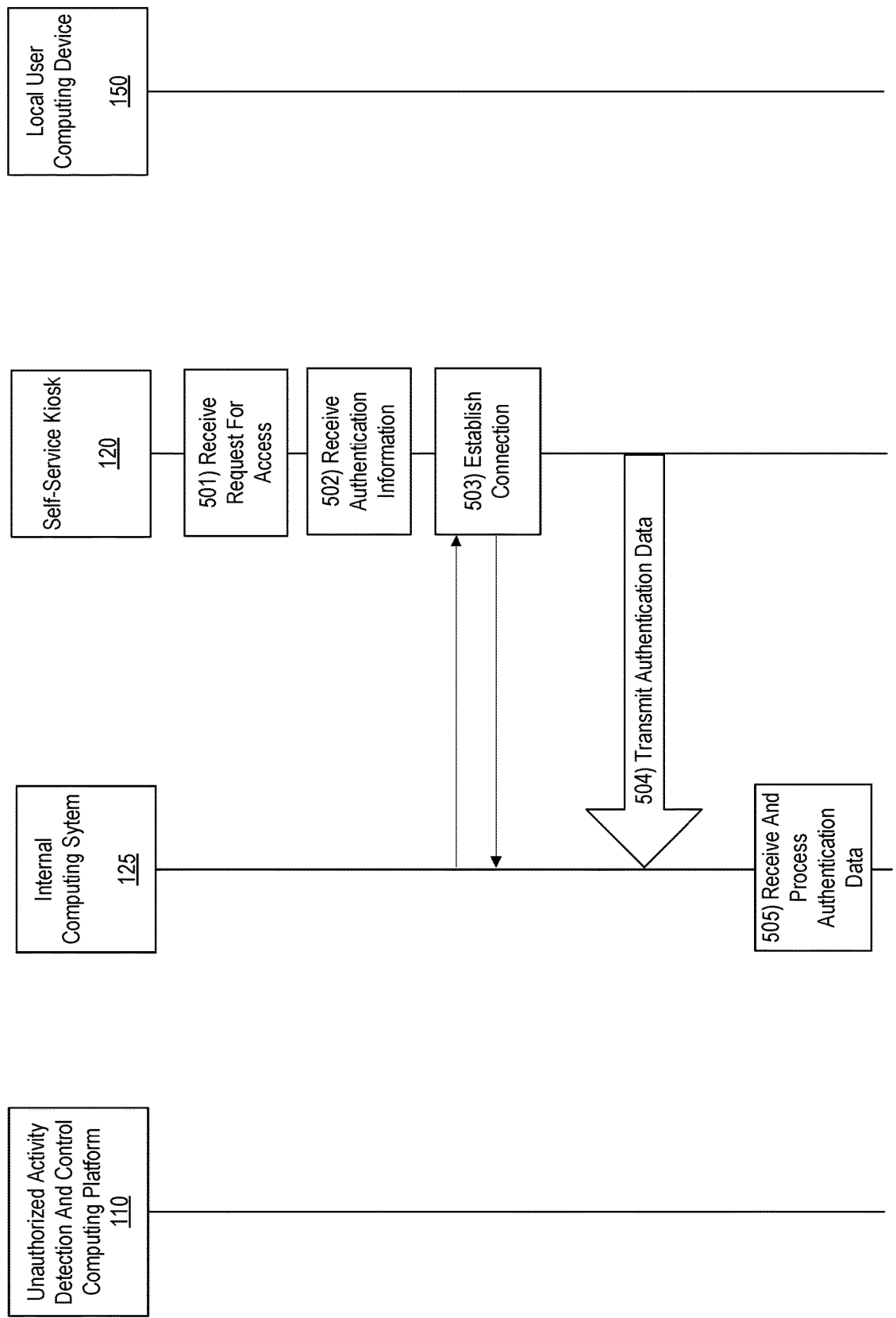
FIGS. 5A-5G depict an illustrative event sequence for implementing dynamic unauthorized activity detection and control functions in accordance with one or more aspects described herein.
Figure 5B:
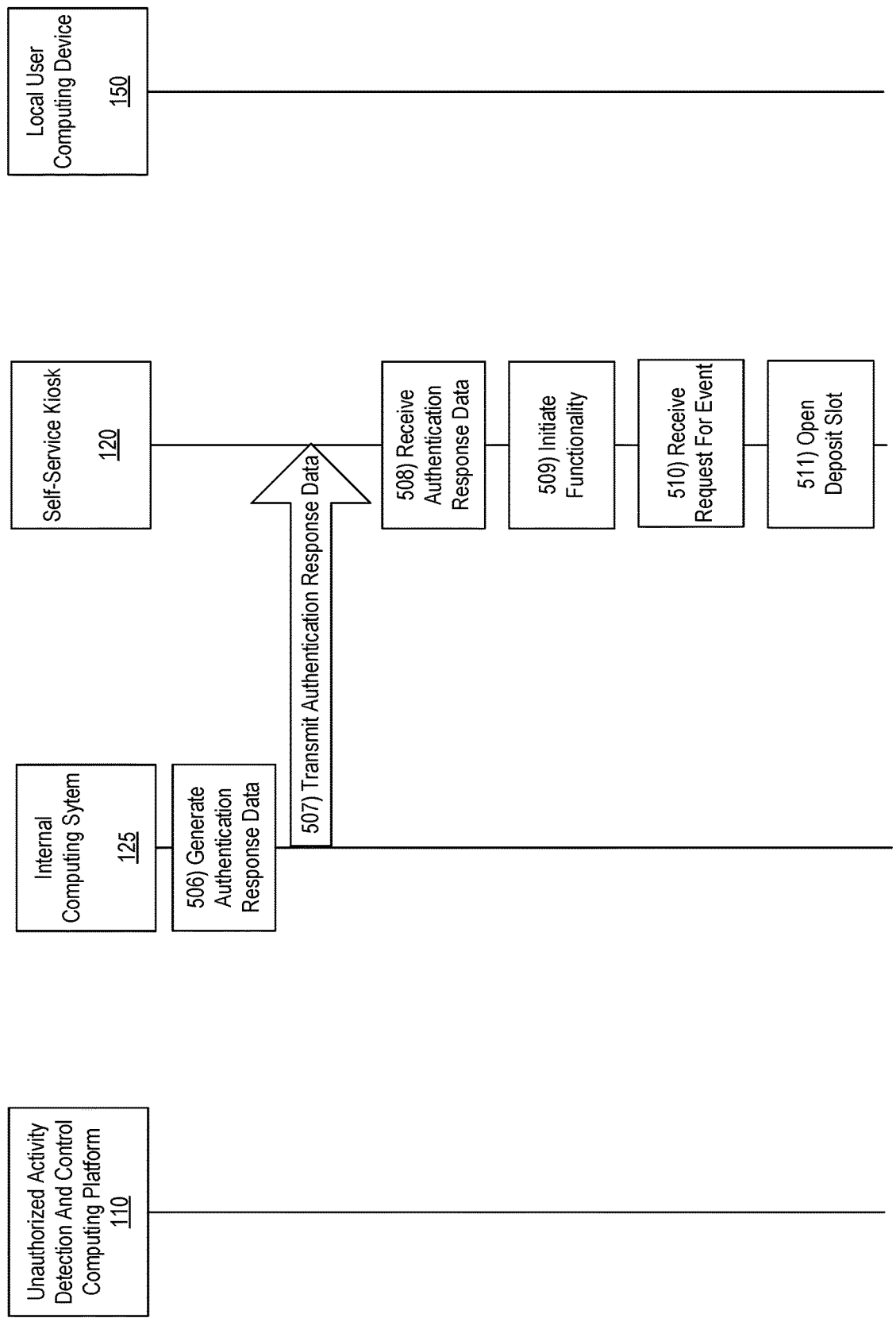

With reference to FIG. 5B, at step 506, the internal computing system 125 may generate authentication response data based on the processing performed at step 505. For instance, if the authentication data received does not match pre-stored data, authentication response data denying the requested event or transaction may be generated. Alternatively, if the received authentication data matches the pre-stored data, authentication response data authenticating the user may be generated.

At step 507, the authentication response data may be transmitted from the internal computing system 125 to the self-service kiosk 120. At step 508, the authentication response data may be received by the self-service kiosk 120.

At step 509, if the authentication response data authenticates the user, functionality associated with the self-service kiosk 120 may be initiated, activated or enabled. For instance, event or transaction processing functions may be initiated, activated or enabled based on the user being authenticated.

At step 510, a request for an event or transaction may be received by the self-service kiosk 120. For instance, user input may be received by the self-service kiosk 120 requesting processing of one or more events or transactions. In some examples, the request for an event or transaction may include a request to deposit funds to a user account via the self-service kiosk 120.

At step 511, a deposit aperture or other device configured to receive items for deposit from a user may be opened or otherwise may be enabled to accept a deposit from the user. In some examples, user's may deposit currency funds, checks, and the like. However, in some examples of unauthorized activity, users may deposit items that are not valid for deposit (e.g., invalid checks, invalid currency, objects not associated with currency or checks or the like).

Figure 5C:
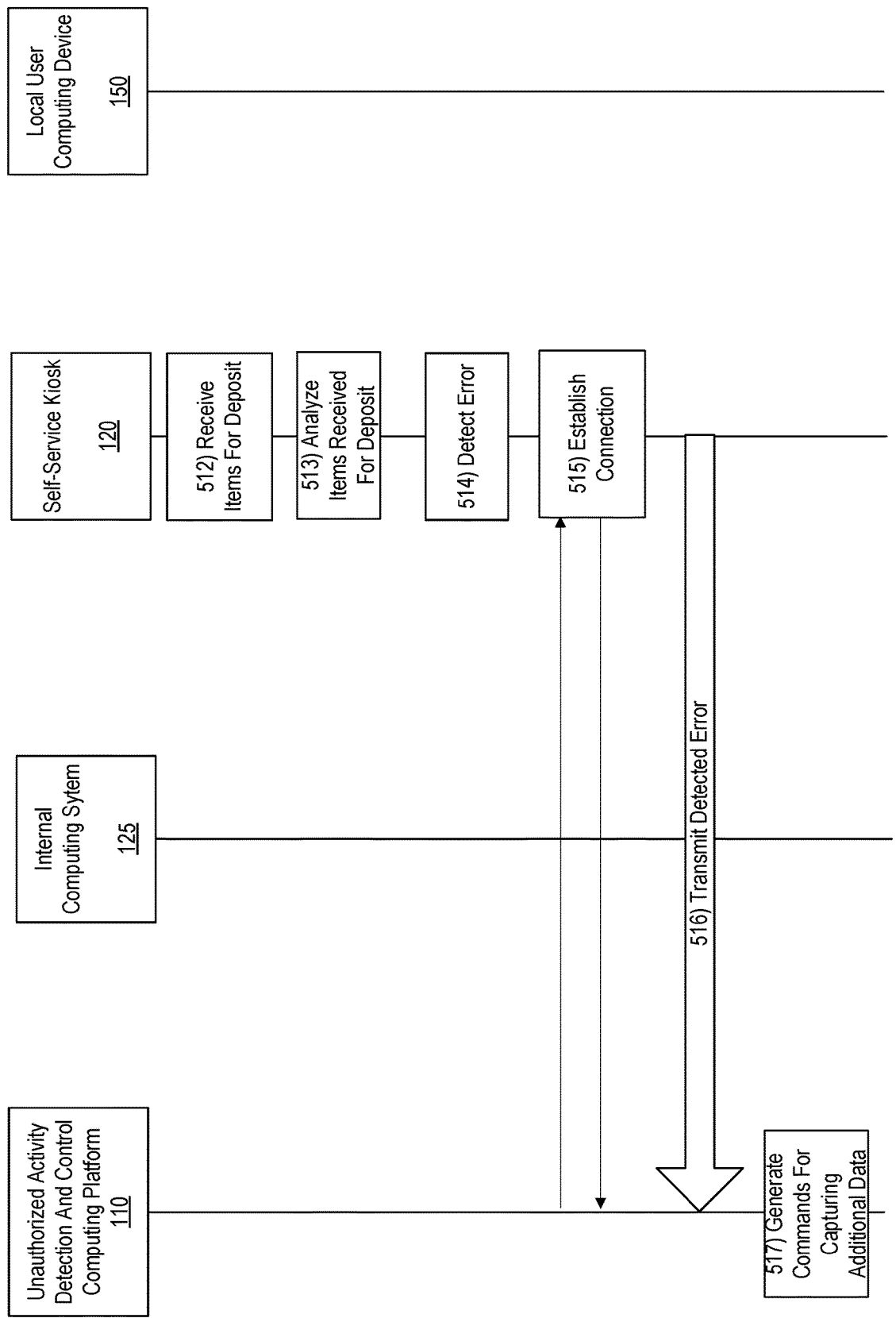

With reference to FIG. 5C, at step 512, one or more items for deposit may be received. As discussed, items received for deposit may include valid currency and/or checks, as well as items that are not valid for deposit.

At step 513, the items received for deposit may be analyzed or evaluated to determine whether they are valid items for deposit. For instance, metal detectors (e.g., the one or more sensing devices may include metal detecting devices) may be used to determine whether the items include metal or other materials not associated with valid items for deposit. Additionally or alternatively, one or more sensing devices may be used to evaluate the items for the presence of a watermark expected on valid items, for threads embedded within valid items, for ink or coloring associated with valid items, and the like.

Further, as items are received for deposit, they may be scanned to capture (e.g., via optical character recognition) a unique identifier, such as a serial number, a denomination, and the like. Additional information may also be capture and this data may be stored in a database, as discussed herein. In receiving an item for deposit, the serial number may be used to determine whether a previous entry in the database was created for that bill. If so, data associated with the bill may be updated after confirming that details match previous details (e.g., that the denomination is the same). If, when comparing a denomination associated with a received bill to a denomination associated with the previously scanned bill having that serial number or unique identifier, a discrepancy is identified, the bill may be flagged as potentially unauthorized and might not be considered valid for deposit.

Based on the evaluation of the items for deposit, if the deposited items are valid, the deposit may be processed and one or more accounts may be modified, updated, credited or the like.

At step 514, based on the evaluation of the items for deposit, if one or more items received are not valid for deposit, an error may be detected in the deposit. In detecting the error, additional information associated with the deposited items may be captured, such as type of error detected, or the like.

At step 515, a connection may be established between self-service kiosk 120 and unauthorized activity detection and control computing platform 110. For instance, a second wireless connection may be established between unauthorized activity detection and control computing platform 110 and self-service kiosk 120. Upon establishing the second wireless connection, a communication session may be initiated between unauthorized activity detection and control computing platform 110 and self-service kiosk 120.

At step 516, the error detection may be transmitted from the self-service kiosk 120 to the unauthorized activity detection and control computing platform 110. In some examples, any additional information associated with the detected error may also be transmitted. In some arrangements, the error detection may be transmitted during the communication session initiated upon establishing the second wireless connection.

At step 517, the error detection may be received by the unauthorized activity detection and control computing platform 110 and one or more instructions or commands to capture additional data may be generated. For instance, based on the error detection, which may include additional details about a type of error, or the like, one or more instructions or commands to capture additional data may be generated by the unauthorized activity detection and control computing platform 110. In some examples, the instructions for capturing additional data may include an instruction to transmit, from one or more image capture and/or sensing devices at the self-service kiosk 120, data, such as image data, video data, and the like. Additionally or alternatively, the one or more instructions or commands may include an instruction or command to activate one or more additional image capture and/or sensing devices and transmit the captured data from additional image capture/sensing device of the self-service kiosk 120 to the unauthorized activity detection and control computing platform 110. In some arrangements, this may include activating recording and/or image capture associated with one or more devices on an exterior of the self-service kiosk 120 and/or one or more devices on an interior of the self-service kiosk.

Figure 5D:
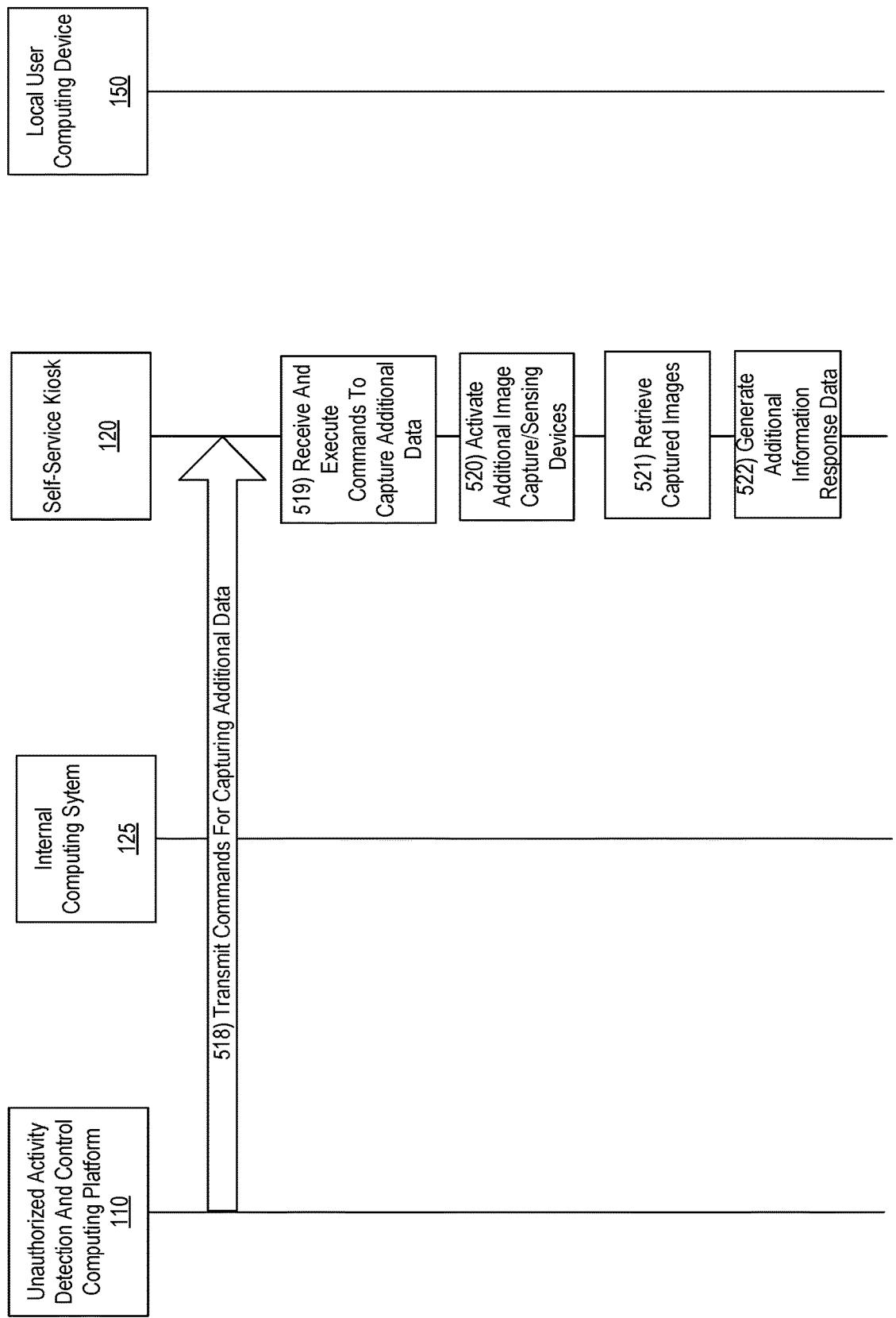

With reference to FIG. 5D, at step 518, the commands or instructions to capture additional data may be transmitted from the unauthorized activity detection and control computing platform 110 to the self-service kiosk 120. In some examples, the generated instructions or commands may be transmitted during the communication session initiated upon establishing the second wireless connection. In other examples, another wireless connection may be established and another communication session may be initiated.

At step 519, the commands or instructions to capture additional information may be received by the self-service kiosk 120 and executed. For instance, at step 420, an instruction or command to activate one or more additional image capture and/or sensing devices may be executed. For instance, one or more additional image capture and/or sensing devices located on an interior or exterior of the self-service kiosk 120 may be activated. In some examples, activating devices on an exterior of the self-service kiosk 120 may aid in capturing images or behavior of the user to determine whether unauthorized activity has occurred or is occurring, to aid in identifying the user executing the unauthorized activity (e.g., in cases where the user may be authenticated using credentials obtained through unauthorized activity, or the like), to identify items inserted into a deposit slot, or the like. In some examples, image capture and/or sensing devices on an interior of the self-service kiosk 120 may be activated in order to determine whether a jam occurred in one or more systems of the self-service kiosk (e.g., in transfer from the storage area to the dispensing device), what invalid items or types of invalid items were inserted into the self-service kiosk 120, or the like. In some examples, image capture devices may include one or more of still and/or video images. Sensing devices may include one or more of pressure sensing devices, motion detecting devices, metal detecting devices, and the like.

At step 521, in another example, at step 424, an instruction or command to retrieve captured images may be executed. For instance, self-service kiosk 120 may have one or more image capture devices that may continuously capture image data, may automatically activate upon detecting a user, or the like. Images captured by these devices may be retrieved based on the instruction executed (e.g., based on date and time requested, for a preceding time period (e.g., last hour, last 24 hours, or the like).

Although this example includes execution of instructions to retrieve images and activate additional devices, in some examples, more or fewer instructions or commands may be generated or executed. Further, in some examples, machine learning may be used to identify particular instructions or commands to generate and execute. For instance, based on details of the error received, machine learning may be used to identify patterns in data in order to identify particular instructions for generation or execution in order to efficiently obtain information to detect unauthorized activity.

At step 522, additional information response data may be generated. For instance, results of any instructions or commands executed by the self-service kiosk 120 may be used to generate additional information response data. Accordingly, the additional information response data may include retrieved images, images captured by newly activated devices, and the like.

Figure 5E:
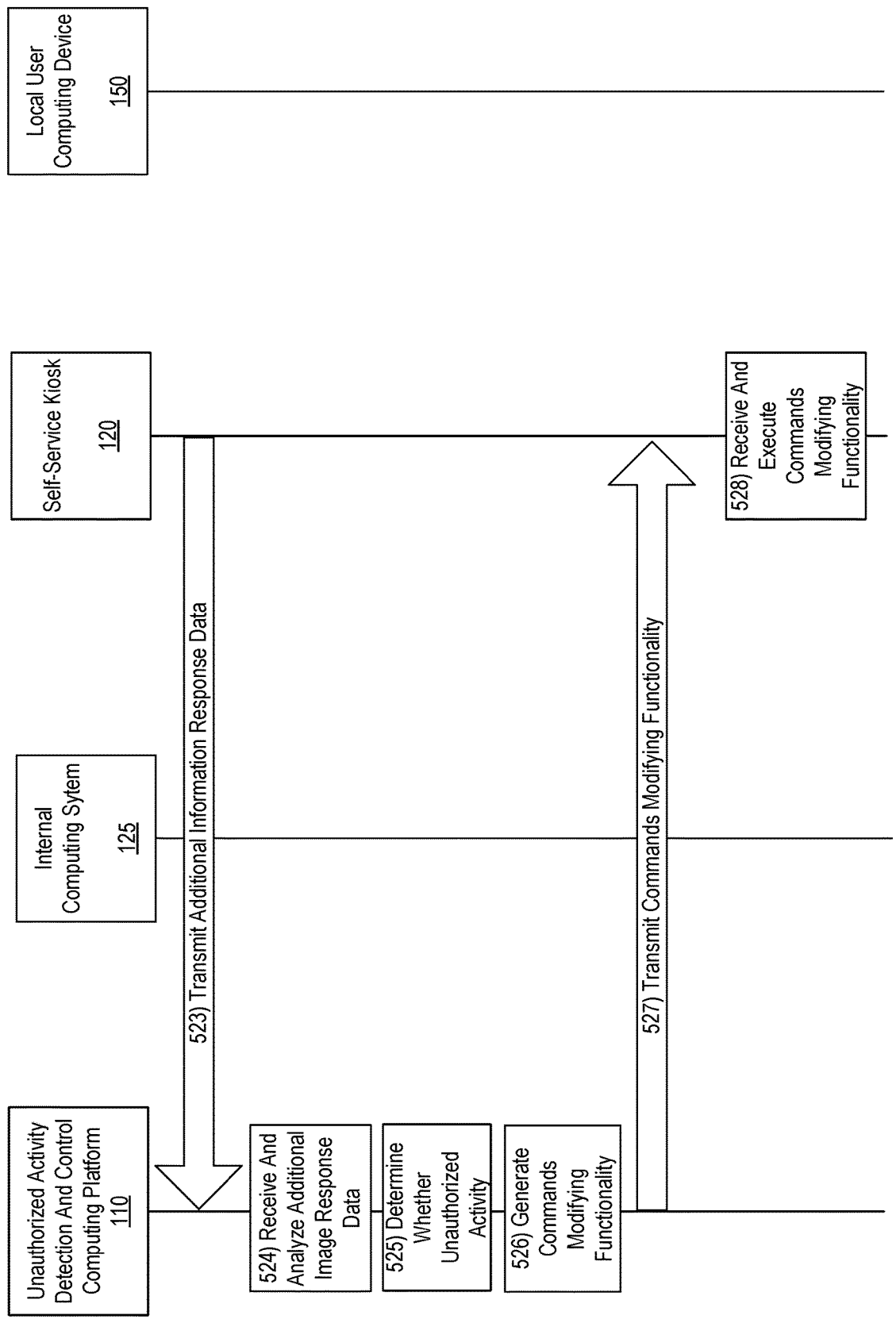

With reference to FIG. 5E, at step 523, the additional information response data may be transmitted from the self-service kiosk 120 to the unauthorized activity detection and control computing platform 110. In some examples, the additional information response data may be transmitted during the communications session initiated upon establishing the second wireless connection. In other examples, another wireless connection may be established and another communication session may be initiated.

At step 524, the additional information response data may be received by the unauthorized activity detection and control computing platform 110 and analyzed. For instance, data from one or more image capture devices and/or sensing devices may be analyzed to confirm the items for deposit were not valid items for deposit and/or evaluate or identify the type of items submitted for deposit. Additionally or alternatively, image data may be analyzed to determine whether the user deliberately inserted the items or the items were deposited in error (e.g., positioned between valid items for deposit, or the like).

At step 525, based on the analysis of the additional information response data, the unauthorized activity detection and control computing platform 110 may determine whether unauthorized activity occurred. For instance, based on the analysis of image data, sensing device data, and the like, a determination may be made as to whether unauthorized activity occurred or whether an error or malfunction occurred.

At step 526, based on the determination, one or more instructions or commands modifying functionality of the self-service kiosk 120 may be generated. For instance, if an error or malfunction occurred, one or more functions or features provided by the self-service kiosk 120 may be disabled until the malfunction may be corrected. Accordingly, an instruction or command to disable one or more functions may be generated. In another example, if unauthorized activity occurred, functionality available to the user at the self-service kiosk 120 (e.g., the user who may have executed the unauthorized activity) may be modified (e.g., deposits only, withdrawals, balance transfers or the like may be disabled). Various other example functionality modifications may be generated without departing from the invention.

At step 527, the commands or instructions modifying functionality of the self-service kiosk 120 may be transmitted from the unauthorized activity detection and control computing platform 110 to the self-service kiosk 120. At step 528, the generated commands or instructions may be received by the self-service kiosk 120 and executed. Executing the commands may include modifying the functionality of the self-service kiosk 120 as outlined in the instructions or commands.

Figure 5F:
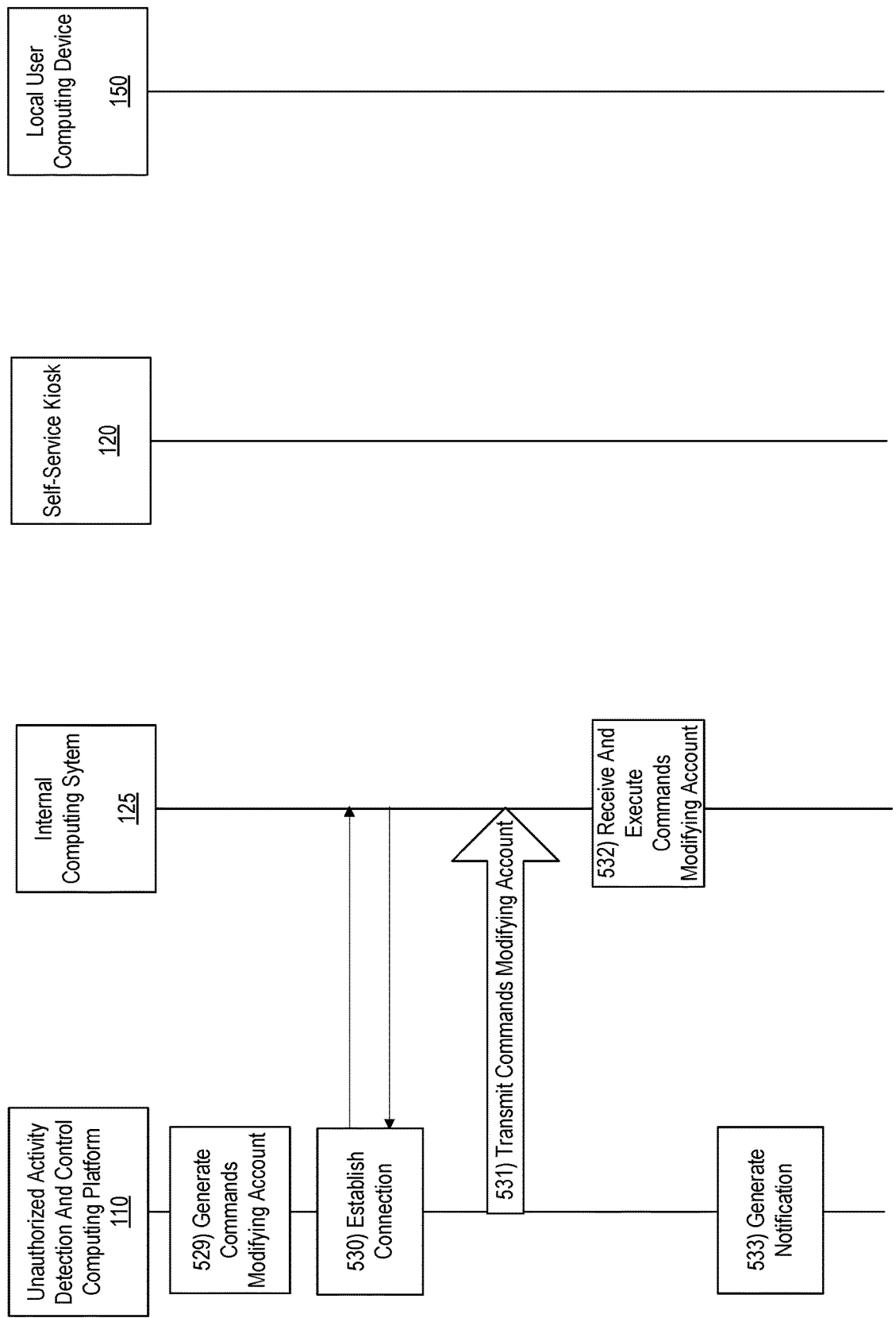

With reference to FIG. 5F, at step 529, based on the analysis performed at step 524 and determination at step 525, one or more instructions modifying an account of the user may be generated. For instance, if unauthorized activity is determined, a command or instruction locking the account associated with the user may be generated. Various other instructions or commands modifying one or more aspects associated with an account of the user may be generated without departing from the invention.

At step 530, a connection may be established between unauthorized activity detection and control computing platform 110 and internal computing system 125. For instance, a third wireless connection may be established between unauthorized activity detection and control computing platform 110 and internal computing system 125. Upon establishing the third wireless connection, a communication session may be initiated between unauthorized activity detection and control computing platform 110 and internal computing system 125.

At step 531, the generated one or more commands or instructions modifying an account may be transmitted from the unauthorized activity detection and control computing platform 110 to the internal computing system 125. The instructions or commands may be transmitted during the communication session initiated upon establishing the third wireless connection.

At step 532, the generated one or more commands or instructions to modify an account may be received by the internal computing system 125 and executed. Executing the one or more commands or instructions may include modifying one or more aspects associated with the account (e.g., modifying a balance, modifying authentication requirements, locking the account, or the like).

At step 533, one or more notifications may be generated. For instance, a notification indicating that unauthorized activity has occurred and additional action should be taken may be generated and transmitted to one or more computing devices. In some examples, law enforcement may be notified of the unauthorized activity. In another example, a notification of an error and/or associated modifications to a user account may be generated. Various other notifications may be generated without departing from the invention.

Figure 5G:
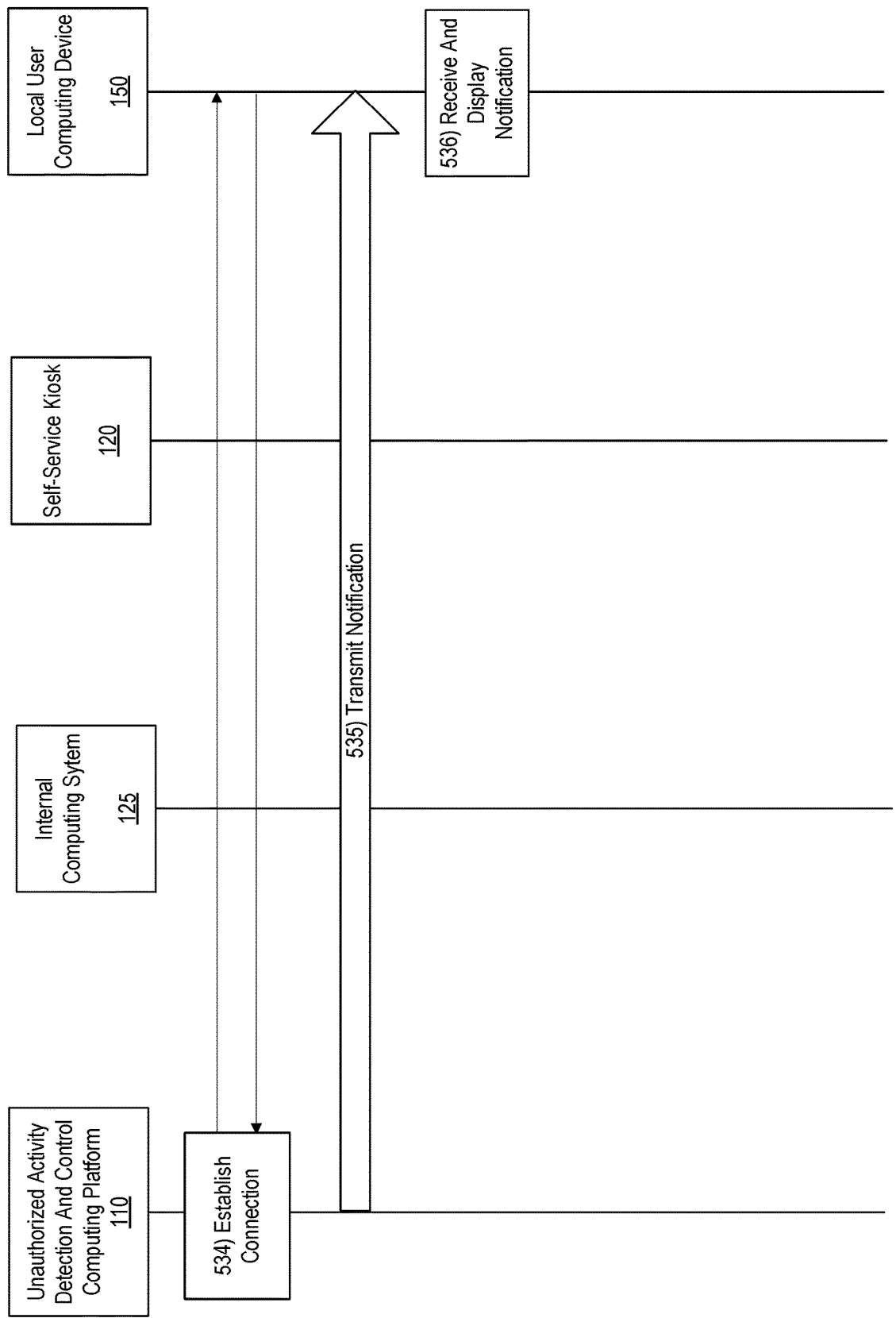

With reference to FIG. 5G, at step 534, a connection may be established between unauthorized activity detection and control computing platform 110 and local user computing device 150. For instance, a fourth wireless connection may be established between unauthorized activity detection and control computing platform 110 and local user computing device 150. Upon establishing the fourth wireless connection, a communication session may be initiated between unauthorized activity detection and control computing platform 110 and local user computing device 150.

At step 535, the generated notification may be transmitted from the unauthorized activity detection and control computing platform 110 to, for instance, local user computing device 150. For instance, if the generated notification includes information related to unauthorized activity, the notification may be transmitted to the local user computing device 150 which may be a computing device associated with a user at the enterprise implementing the unauthorized activity detection and control computing platform 110, such as a banking associate, system administrator, or the like. The notification may be transmitted during the communication session initiated upon establishing the fourth wireless connection.

Although the example shown in FIG. 5G illustrates a notification being sent to local user computing device 150, in some examples, a notification may be transmitted to remote user computing device 170 associated with a user of the account in addition to or in lieu or sending this notification. In some examples, the device to which the notification is transmitted may be based on whether unauthorized activity was identified or not.

At step 536, the generated notification may be received by the local user computing device 150 and displayed on a display of the local user computing device 150.

Figure 6:
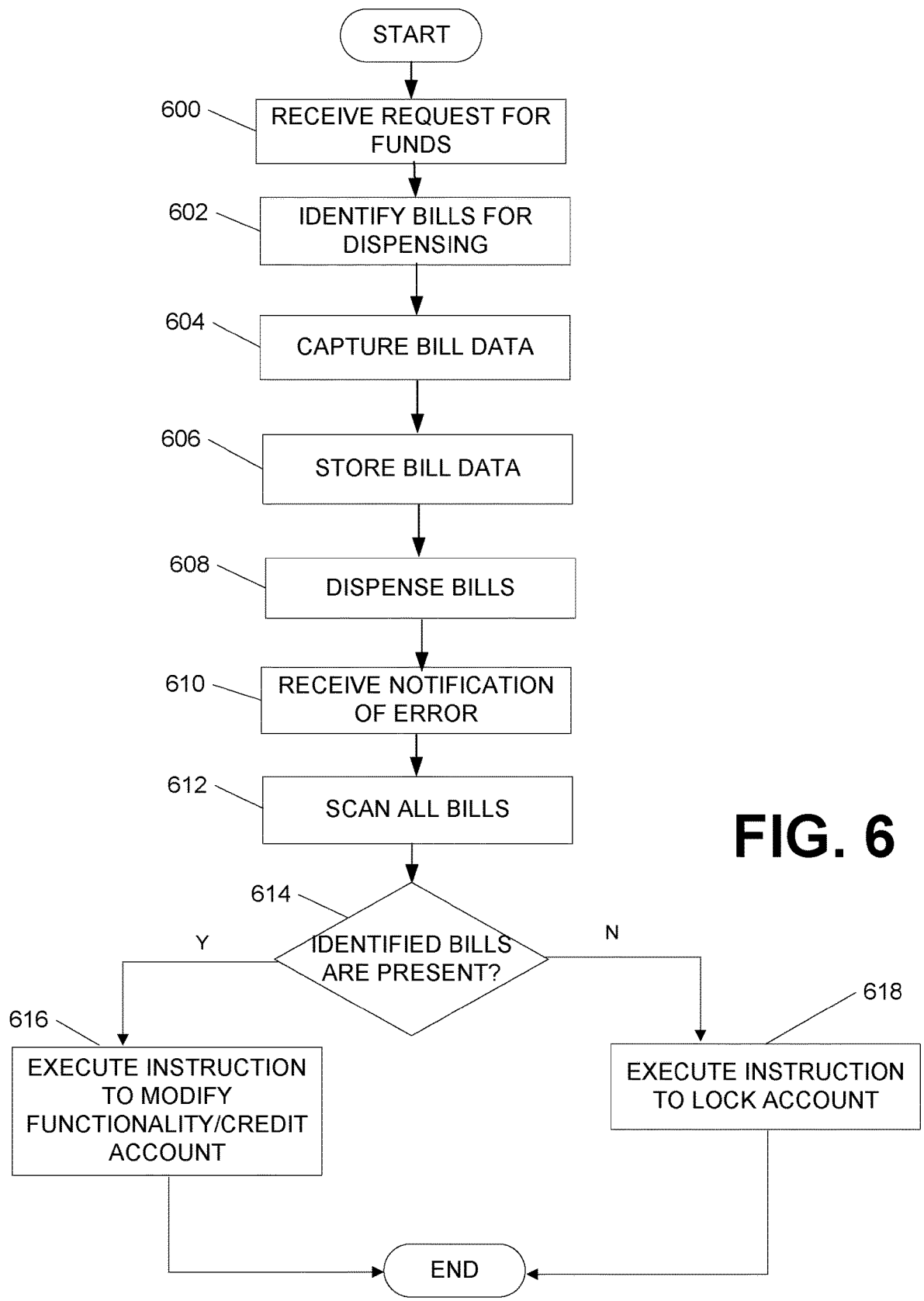
FIG. 6 depicts an illustrative method for implementing and using dynamic unauthorized activity detection and control functions according to one or more aspects described herein.

FIG. 6 is a flow chart illustrating one example method of implementing dynamic unauthorized activity detection and control functions according to one or more aspects described herein. The processes illustrated in FIG. 6 are merely some example processes and functions. The steps shown may be performed in the order shown, in a different order, more steps may be added, or one or more steps may be omitted, without departing from the invention. In some examples, one or more steps may be performed simultaneously with other steps shown and described.

At step 600, request for funds may be received by, for instance, a self-service kiosk, such as an ATM, ATA, or the like. The request for funds may include a request for a particular amount of currency.

At step 602, one or more currency bills for dispensing may be identified. For instance, a first plurality of currency bills may be stored in a storage area of the self-service kiosk 120. Upon receiving the request for funds, a second plurality of bills (e.g., a portion or fewer than all of the bills in the storage area of the self-service kiosk 120) may be identified for dispensing. The second plurality of bills may have denominations corresponding to the requested amount.

At step 604, currency bill data associated with each currency bill in the second plurality of currency bills may be captured. For instance, each currency bill in the second plurality of currency bills may be scanned (e.g., via a scanning device of the self-service kiosk) to identify a unique identifier associated with each bill (e.g., a serial number) and/or a denomination of each currency bill. In some examples, additional information, such as location, time, date, or the like, may also be captured. The currency bills of the second plurality of currency bills may be flagged as being dispensed.

At step 606, the captured bill data may be stored. For instance, a database storing bill identification data may be updated and/or modified to include current information related to each currency bill and the indication that the bills are being dispensed.

At step 608, the second plurality of bill may be transferred for dispensing. For instance, the second plurality of bills may be transferred from the storage area of the self-service kiosk 120 to a dispensing device of the self-service kiosk 120.

At step 610, a notification of error may be received. For instance, the self-service kiosk 120 may receive a notification that an error or malfunction occurred in dispensing the second plurality of currency bills. In some examples, the notification of error may be received from a user (e.g., via user input into the self-service kiosk 120 or other computing device).

At step 612, an instruction to scan all currency bills within the self-service kiosk 120 may be executed. For instance, in order to determine whether the second plurality of currency bills were actually dispensed or are, for example, causing a jam in the self-service kiosk 120, an instruction to scan all currency bills within the self-service kiosk 120 may be executed. The scan may be performed by scanning device of the self-service kiosk and may include capturing the unique identifier associated with each bill. As each unique identifier is captured by the scanning device, it may be compared to the unique identifier associated with each currency bill of the second plurality of currency bills. The scan may continue until all currency bills of the second plurality of currency bills are identified during the scan (e.g., each unique identifier is detected during the scan) or until all bills have been scanned.

At step 614, a determination may be made as to whether the currency bills of the second plurality of bills are still present within the self-service kiosk 120. For instance, if the unique identifier associated with the currency bills of the second plurality of currency bills are detected, an error or malfunction has occurred and the bills were not properly dispensed. If they are not detected, unauthorized activity (e.g., a report that the user did not receive the funds when he or she did) may be occurring.

If, at step 614, the second plurality of currency bills is present, an instruction to modify the functionality of the self-service kiosk and/or credit an account of a user may be executed at step 616. For instance, if the bills did not dispense properly, the functionality of the self-service kiosk may be modified to prevent further withdrawals until the error or malfunction can be evaluated or fixed. Additionally or alternatively, the user account may be credited in the amount that was indicated as dispensed but was not actually dispensed.

If, at step 614, the second plurality of currency bills is not present, unauthorized activity may be occurring an instruction to lock an account of a user may be executed at step 618. Locking the account of the user may include preventing access to the account, preventing deposits or withdrawals to the account, generating a transmitting a notification to the user, and the like.

Figure 7:
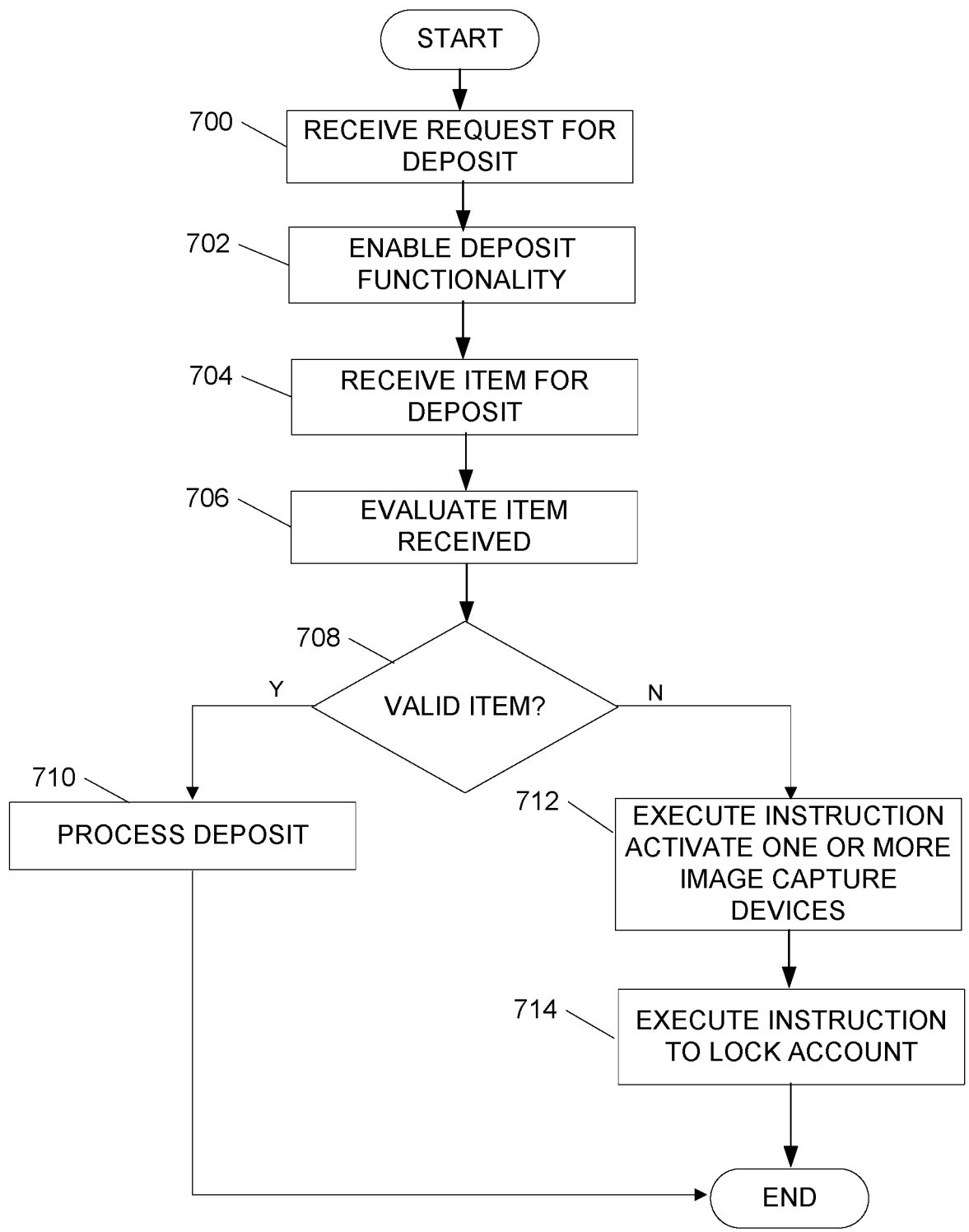
FIG. 7 depicts an illustrative method for implementing and using dynamic unauthorized activity detection and control functions in accordance with one or more aspects described herein.

FIG. 7 is a flow chart illustrating one example method of implementing dynamic unauthorized activity detection and control functions according to one or more aspects described herein. The processes illustrated in FIG. 7 are merely some example processes and functions. The steps shown may be performed in the order shown, in a different order, more steps may be added, or one or more steps may be omitted, without departing from the invention. In some examples, one or more steps may be performed simultaneously with other steps shown and described.

At step 700, request to make a deposit may be received by, for instance, a self-service kiosk, such as an ATM, ATA, or the like.

At step 702, responsive to receiving the request for deposit, deposit functionality of the self-service kiosk 120 may be enabled. For instance, one or more functions associated with receiving a deposit may be activated, initiated or enabled.

At step 704, one or more items for deposit may be received. In some examples, the one or more items for deposit may be received in one process (e.g., all items for deposit inserted into a deposit device at one time). In other examples, each item may be received individually.

At step 706, the one or more items for deposit may be evaluated to determine whether they include valid items for deposit. For instance, each item submitted for deposit may be evaluated to determine whether it includes metal or other material not associated with valid items for deposit. In another example, each item for deposit may be evaluated to determine whether it includes an expected watermark, ink color, embedded threat, or the like. Various other aspects of the items may be evaluated to determine whether they are valid items for deposit without departing from the invention.

At step 708, a determination may be made, based on the evaluation, of whether the one or more items for deposit are valid items. If so, the deposit may be processed at step 710 and a user account may be credited with an amount of the deposit.

If, at step 708, the one or more items for deposit include at least one item not valid for deposit, at step 712, an instruction to activate one or more image capture devices may be executed. For instance, an instruction to activate one or more image capture devices on an interior of the self-service kiosk 120 or an exterior of the self-service kiosk 120 may be executed. Additional information may be captured by the image capture devices and may be used to identify one or more mitigating actions, confirm unauthorized activity, or the like.

At step 714, an instruction to lock an account of the user associated with the request for deposit may be executed.

Locking the account of the user may include preventing access to the account until the unauthorized activity is further evaluated.

FIG. 8 illustrates one example notification that may be generated and transmitted according to one or more aspects described herein. The notification in FIG. 8 may include a user interface 800 that may be transmitted to, for instance, a user computing device. The interface 800 includes an indication that an error or malfunction occurred and that the user's account may be credited as needed.

FIG. 9 illustrates one example notification that may be generated and transmitted according to one or more aspects described herein. The notification in FIG. 9 may include a user interface 900 that may be transmitted to, for example, a local user computing device associated with the enterprise organization associated with the self-service kiosk. The interface 900 may include an indication that unauthorized activity was detected, a location of the activity and one or more mitigating actions that were executed.

The example notifications in FIGS. 8 and 9 are merely some example notifications and other notifications, having alternative or additional information, may be generated without departing from the invention. In order to track currency bills and facilitate analysis of potential unauthorized activity, a catalogue of currency may be established, as discussed herein. The catalogue may include a database storing a unique identifier associated with each bill captured by the system, as well as additional details such as denomination, location, and the like. Accordingly, a record of circulation of each bill captured may be maintained. In some examples, the catalogue may enable an entity, such as a financial institution, retail establishment, or the like, to know exactly which bills are held by the entity (e.g., based on unique identifier) at any given time.

As discussed herein, aspects described relate to detection of unauthorized activity and execution of one or more mitigating actions in response to the detected unauthorized activity. As discussed herein, various forms of unauthorized activity may be executed at a self-service kiosk. For instance, a user may report that he or she did not receive funds requested for withdrawal or did not receive the full amount of funds, users may attempt to deposit items that are not valid currency, or the like. Accordingly, arrangements described herein modify functionality of self-service kiosks to enable evaluation of currency and other items to quickly detect unauthorized activity and efficiently execute mitigating actions.

For instance, a self-service kiosk may have a storage area that includes a plurality of currency bills. Identifying information associated with each bill in the storage area may be captured (e.g., as bills are received, as bills are loaded into the storage area, or the like). As requests for withdrawals are received, identifying information associated with bills being dispensed may be captured and an indication that the bills are being dispensed may be stored. If an report of a failure of funds to dispense or an inaccurate amount of funds dispensing is received, the system may retrieve data associated with the dispensed funds for that transaction and may scan bills within the self-service kiosk to determine whether the bills are present. Additionally or alternatively, image data may be used to determine whether the bills were dispensed (e.g., image data from an interior of the self-service kiosk showing the dispensing device, image data from an exterior of the self-service kiosk showing the dispensed bills, and the like).

As discussed, currency may be scanned at a plurality of different entities or currency bill scan data may be received from a plurality of different channels (e.g., self-service kiosk, banking associate, and the like). Accordingly, as currency bills are received or dispensed by any of the plurality of entities, data associated with movement of each bill and data identifying each bill may be captured and stored. Accordingly, if a particular bill is detected as part of one or more unauthorized activities, the route of that bill in circulation may be retrieved from the database. In some examples, machine learning may be used to detect patterns in the route of one or more bills to detect or predict unauthorized activity. For instance, machine learning may be used to identify other bills having similar patterns or routes of circulation to bills identified as used in unauthorized activity, which may indicate additional unauthorized activity. Using machine learning may allow the system to process vast amounts of data quickly in order to predicting or detect, early in an occurrence of unauthorized activity, the activity and execute one or more mitigating actions.

In some examples, if unauthorized activity is detected but currency has already been dispensed, the bills dispensed (e.g., via a self-service kiosk, banking associate, retail establishment, or the like) may be flagged and, upon being scanned (e.g., when used by an unauthorized actor) the transaction for which the bills are being used may be identified as potential unauthorized activity, cancelled, investigated, law enforcement may be called, or the like.

For instance, if an unauthorized actor enters a banking location and withdraws funds from another person's account, the funds may be dispensed to the unauthorized actor. The identifier features of each bill dispensed may be captured and stored. Accordingly, when the authorized user detects the unauthorized activity and reports it, the identifying features of the dispensed bills may be retrieved and flagged. If those bills should be received by another entity (e.g., deposited at another financial institution, used to make a purchase at a retail establishment), the bills may be scanned upon receipt (e.g., to update the currency catalogue) and a notification or warning that the bills are associated with unauthorized activity may be transmitted or displayed. Accordingly, any further impact of the unauthorized activity may be reduced or eliminated.

In some examples, as potential issues are detected, one or more alerts (e.g., automated alerts) may be generated and transmitted. For instance, as discussed herein, when potential unauthorized activity occurs at a self-service kiosk, notifications may be generated and transmitted to a user, a system administrator, or the like. Additionally or alternatively, if one or more currency bills are associated with unauthorized activity, an automated alert may be transmitted to one or more other entities (e.g., other financial institutions, retail establishments, or the like) indicating the occurrence of potential unauthorized activity. In some examples, an automated alert may be transmitted to law enforcement.

As discussed herein, data from one or more image capture devices, sensing devices, and the like, may be used to analyze the potential unauthorized activity. In some examples, image and/or sensor data from one or more devices that may continuously monitor the self-service kiosk or may be activated upon initiation of a transaction, presence of a user, or the like may be retrieved and used. Additionally or alternatively, upon detecting potential unauthorized activity, one or more additional image capture devices, sensing devices, or the like, may be activated and data received and analyzed from the additional devices.

As discussed, unauthorized activity associated with deposits at a self-service kiosk may also be detected. As described, unauthorized actors may insert items for deposit that may not be valid items. In some examples, household items (e.g., plastic or metal spatula, or the like), non-currency paper, and the like, may be inserted for deposit in an effort to execute unauthorized activity. However, by evaluating items for deposit, as discussed herein, the potential unauthorized activity may be detected before the deposit is processed (e.g., before a balance of an account of the user is modified) in order to mitigate impact of the unauthorized activity.

In some examples, metal detecting devices may be used to detect objects that are not valid for deposit. In another example, as discussed above, items for deposit may be scanned and the unique identifier and denomination captured. This data may be compared to previous stored data for the bill (e.g., if the bill was previously scanned and data stored in the database). If a discrepancy is detected, the bill may be flagged as potential unauthorized activity.

For instance, an unauthorized actor may modify a bill having a denomination of $5 to appear to be a bill having a denomination of $20. When the modified bill is scanned after being deposited, the unique identifier and denomination (e.g., $20 on the newly received bill) may be compared to a previous entry in the database which may reflect that the unique identifier is associated with a bill having a denomination of $5. Accordingly, the bill may be flagged as potential unauthorized activity prior to processing the deposit.

As discussed, when a plurality of items is submitted for deposit, each item may be evaluated to determine whether it is a valid item for deposit. For instance, if a plurality of items are submitted for deposit, some items may be valid for deposit while others are not. Accordingly, each item may be evaluated individually to determine validity for deposit.

Further, a variety of mitigating actions may be executed based on detection of unauthorized activity. For instance, limiting or disabling functionality of a self-service kiosk until further investigation is completed, locking an account of a user, limiting functionality of the self-service kiosk for the particular user, and the like. In some examples, the mitigating actions executed may depend on a time of day at which the unauthorized activity occurred. For instance, if during business hours, the self-service kiosk may be disabled and a banking associate may service the self-service kiosk. Alternatively, if the unauthorized activity occurs outside of normal business hours, some functionality of the self-service kiosk may be maintained.

In some examples, upon detecting an issue associated with items deposited, additional information associate with the deposit may be captured or recorded to aid in investigating the occurrence. For instance, additional images, data, and the like, associated with the transaction or for a predetermined time period surrounding the issue may be captured and used for further investigation into the issue.

Accordingly, by enhancing functionality of self-service kiosks, and by creating a catalogue of currency in circulation, unauthorized activity may be quickly detected and mitigating actions efficiently implemented.

Figure 10:
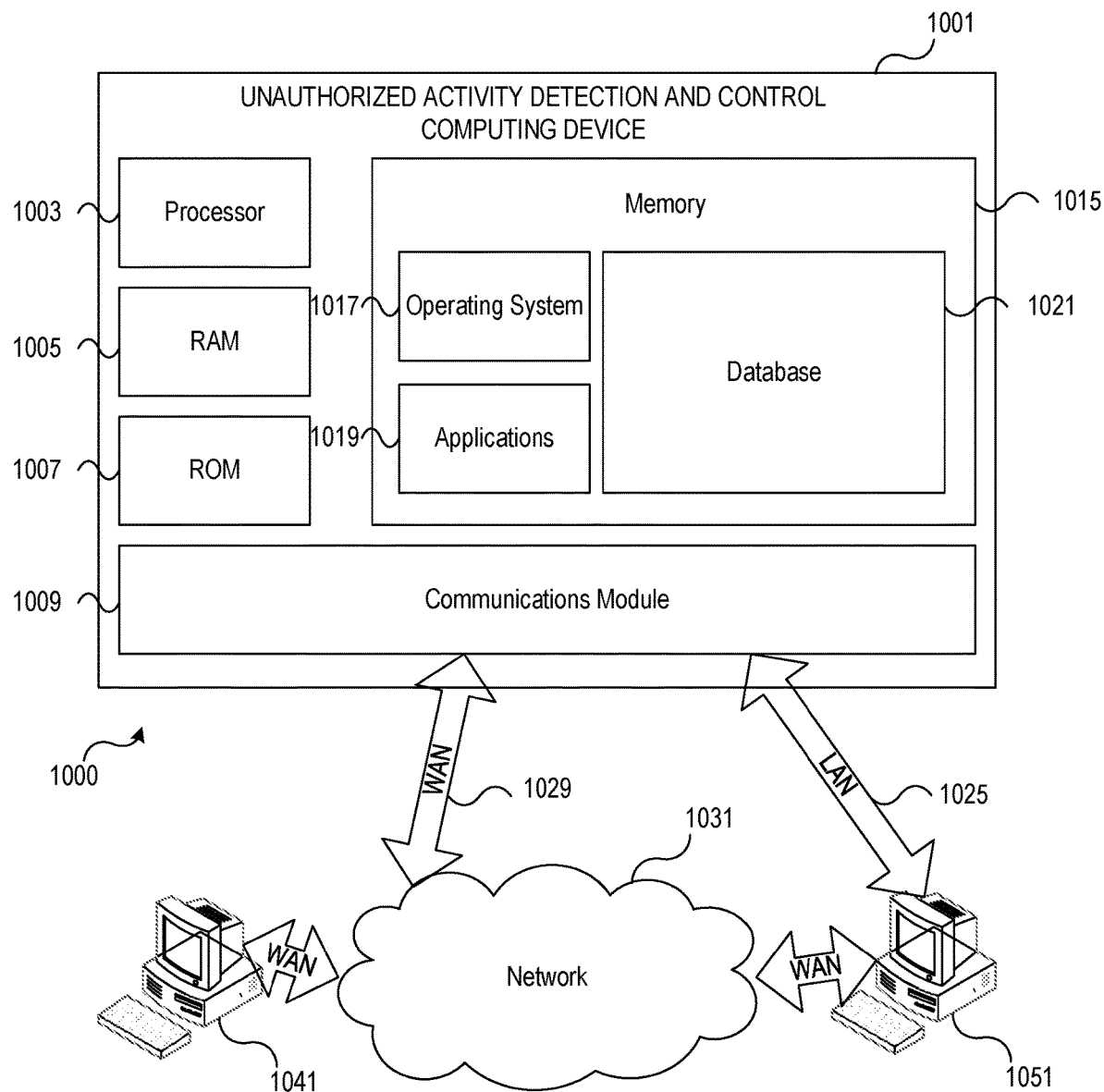
FIG. 10 illustrates one example environment in which various aspects of the disclosure may be implemented in accordance with one or more aspects described herein.

FIG. 10 depicts an illustrative operating environment in which various aspects of the present disclosure may be implemented in accordance with one or more example embodiments. Referring to FIG. 10, computing system environment 1000 may be used according to one or more illustrative embodiments. Computing system environment 1000 is only one example of a suitable computing environment and is not intended to suggest any limitation as to the scope of use or functionality contained in the disclosure. Computing system environment 1000 should not be interpreted as having any dependency or requirement relating to any one or combination of components shown in illustrative computing system environment 1000.

Computing system environment 1000 may include unauthorized activity detection and control computing device 1001 having processor 1003 for controlling overall operation of unauthorized activity detection and control computing device 1001 and its associated components, including Random Access Memory (RAM) 1005, Read-Only Memory (ROM) 1007, communications module 1009, and memory 1015. Unauthorized activity detection and control computing device 1001 may include a variety of computer readable media. Computer readable media may be any available media that may be accessed by unauthorized activity detection and control computing device 1001, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by unauthorized activity detection and control computing device 1001.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on unauthorized activity detection and control computing device 1001. Such a processor may execute computer-executable instructions stored on a computer-readable medium.

Software may be stored within memory 1015 and/or storage to provide instructions to processor 1003 for enabling unauthorized activity detection and control computing device 1001 to perform various functions as discussed herein. For example, memory 1015 may store software used by unauthorized activity detection and control computing device 1001, such as operating system 1017, application programs 1019, and associated database 1021. Also, some or all of the computer executable instructions for unauthorized activity detection and control computing device 1001 may be embodied in hardware or firmware. Although not shown, RAM 1005 may include one or more applications representing the application data stored in RAM 1005 while unauthorized activity detection and control computing device 1001 is on and corresponding software applications (e.g., software tasks) are running on unauthorized activity detection and control computing device 1001.

Communications module 1009 may include a microphone, keypad, touch screen, and/or stylus through which a user of unauthorized activity detection and control computing device 1001 may provide input, and may also include one or more of a speaker for providing audio output and a video display device for providing textual, audiovisual and/or graphical output. Computing system environment 1000 may also include optical scanners (not shown in FIG. 10).

Unauthorized activity detection and control computing device 1001 may operate in a networked environment supporting connections to one or more remote computing devices, such as computing devices 1041 and 1051. Computing devices 1041 and 1051 may be personal computing devices or servers that include any or all of the elements described above relative to unauthorized activity detection and control computing device 1001.

The network connections depicted in FIG. 10 may include Local Area Network (LAN) 1025 and Wide Area Network (WAN) 1029, as well as other networks. When used in a LAN networking environment, unauthorized activity detection and control computing device 1001 may be connected to LAN 1025 through a network interface or adapter in communications module 1009. When used in a WAN networking environment, unauthorized activity detection and control computing device 1001 may include a modem in communications module 1009 or other means for establishing communications over WAN 1029, such as network 1031 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

Figure 11:
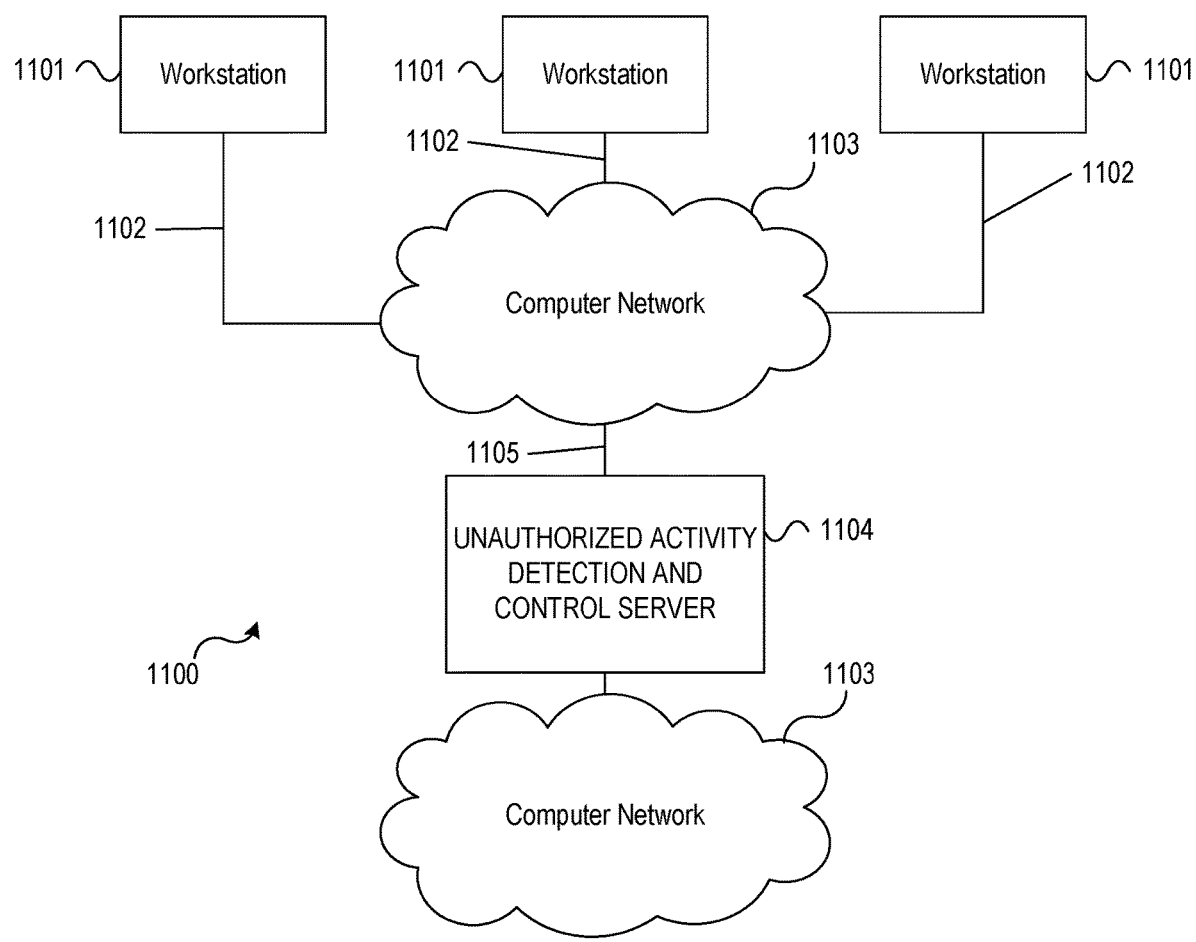
FIG. 11 depicts an illustrative block diagram of workstations and servers that may be used to implement the processes and functions of certain aspects of the present disclosure in accordance with one or more aspects described herein.

FIG. 11 depicts an illustrative block diagram of workstations and servers that may be used to implement the processes and functions of certain aspects of the present disclosure in accordance with one or more example embodiments. Referring to FIG. 11, illustrative system 1100 may be used for implementing example embodiments according to the present disclosure. As illustrated, system 1100 may include one or more workstation computers 1101. Workstation 1101 may be, for example, a desktop computer, a smartphone, a wireless device, a tablet computer, a laptop computer, and the like, configured to perform various processes described herein. Workstations 1101 may be local or remote, and may be connected by one of communications links 1102 to computer network 1103 that is linked via communications link 1105 to unauthorized activity detection and control server 1104. In system 1100, unauthorized activity detection and control server 1104 may be a server, processor, computer, or data processing device, or combination of the same, configured to perform the functions and/or processes described herein. Server 1104 may be used to receive requests for funds or deposits, identify bills for dispensing, scan bills, evaluate items for deposit, determine whether unauthorized activity has occurred, generate and execute one or more instructions associated with mitigating actions, and the like.

Computer network 1103 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 1102 and 1105 may be communications links suitable for communicating between workstations 1101 and unauthorized activity detection and control server 1104, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A system, comprising:
a self-service kiosk including at least one computing device having at least one processor, a communication interface communicatively coupled to the at least one processor, and a memory storing computer-readable instructions that, when executed by the at least one processor, cause at least one computing device of the system to:
receive a request for funds, the request for funds including a request for an amount of currency,
select, from a first plurality of currency bills in a storage area of the self-service kiosk, a second plurality of currency bills corresponding to the amount of currency;
transfer the second plurality of currency bills from the storage area to a dispensing device of the self-service kiosk;
identify, by a scanning device of the self-service kiosk and using optical character recognition, a unique identifier associated with each currency bill of the second plurality of currency bills;
store, in a bill identification database, the identified unique identifiers associated with each currency bill of the second plurality of currency bills and an indication that the second plurality of currency bills are being dispensed;
receive an indication of an error by the self-service kiosk;
responsive to receiving the indication of the error, scan, by the scanning device of the self-service kiosk, all currency bills within the self-service kiosk to identify the unique identifier associated with each currency bill within the self-service kiosk;
determine, based on the identified unique identifier associated with each currency bill within the self-service kiosk, whether the currency bills of the second plurality of currency bills are present within the self-service kiosk;
responsive to determining the currency bills of the second plurality of currency bills are present within the self-service kiosk, executing an instruction to credit an account of a user associated with the request for funds in the amount of the currency; and
responsive to determining the currency bills of the second plurality of currency bills are not present in the self-service kiosk, flagging the indication of the error as unauthorized activity and executing an instruction to lock the account of the user associated with the request for funds.

2. The system of claim 1, further including instructions that, when executed, cause the at least one computing device to:
responsive to receiving the indication of the error, activate one or more image capture devices of the self-service kiosk.

3. The system of claim 2, further including instructions that, when executed, cause the at least one computing device to:
receive, from the one or more image capture devices, image data; and
analyze the image data,
wherein determining whether the currency bills of the second plurality of currency bills are present within the self-service kiosk is further based on the analyzed image data.

4. The system of claim 1, further including instructions that, when executed, cause the at least one computing device to:
identify, by the scanning device of the self-service kiosk and using optical character recognition, a denomination of each currency bill of the second plurality of currency bills, and
wherein storing, in the bill identification database, the identified unique identifiers associated with each currency bill of the second plurality of currency bills and an indication that the second plurality of currency bills are being dispensed further includes storing the identified denomination.

5. The system of claim 1, further including instructions that, when executed, cause the at least one computing device to:
prior to receiving the request for funds:
scanning, by the scanning device of the self-service kiosk, all currency bills in the storage area of the self-service kiosk to identify a unique identifier associated with each currency bill and a denomination of each currency bill; and
storing, by the bill identification database, the unique identifier and denomination of all currency bills in the storage area of the self-service kiosk.

6. The system of claim 5, further including instructions that, when executed, cause the at least one computing device to:
capture additional information associated with a current location, date and time for each currency bill in the storage area of the self-service kiosk; and
storing the captured additional information in the bill identification database.

7. The system of claim 1, wherein the indication of an error includes an indication that the second plurality of currency bills did not dispense.

8. A method, comprising:
receiving, by a computing device of a self-service kiosk, the computing device having a memory and at least one processor, a request for funds, the request for funds including a request for an amount of currency,
selecting, by the computing device and from a first plurality of currency bills in a storage area of the self-service kiosk, a second plurality of currency bills corresponding to the amount of currency;
transferring, by the computing device, the second plurality of currency bills from the storage area to a dispensing device of the self-service kiosk;
identifying, by the computing device and via a scanning device of the self-service kiosk and using optical character recognition, a unique identifier associated with each currency bill of the second plurality of currency bills;
storing, by the computing device and in a bill identification database, the identified unique identifiers associated with each currency bill of the second plurality of currency bills and an indication that the second plurality of currency bills are being dispensed;
receiving, by the computing device, an indication of an error by the self-service kiosk;

responsive to receiving the indication of the error, scanning, by the computing device and via the scanning device of the self-service kiosk, all currency bills within the self-service kiosk to identify the unique identifier associated with each currency bill within the self-service kiosk;

determining, by the computing device and based on the identified unique identifier associated with each currency bill within the self-service kiosk, whether the currency bills of the second plurality of currency bills are present within the self-service kiosk;

if it is determined that the currency bills of the second plurality of currency bills are present within the self-service kiosk, executing an instruction to credit an account of a user associated with the request for funds in the amount of the currency; and if it is determined that the currency bills of the second plurality of currency bills are not present in the self-service kiosk, flagging the indication of the error as unauthorized activity and executing an instruction to lock the account of the user associated with the request for funds.

9. The method of claim 8, further including:
responsive to receiving the indication of the error, activating, by the computing device, one or more image capture devices of the self-service kiosk.

10. The method of claim 9, further including:
receiving, by the computing device and from the one or more image capture devices, image data; and
analyzing, by the computing device, the image data,
wherein determining whether the currency bills of the second plurality of currency bills are present within the self-service kiosk is further based on the analyzed image data.

11. The method of claim 8, further including:
identifying, by the computing device and via the scanning device of the self-service kiosk and using optical character recognition, a denomination of each currency bill of the second plurality of currency bills, and
wherein storing, in the bill identification database, the identified unique identifiers associated with each currency bill of the second plurality of currency bills and an indication that the second plurality of currency bills are being dispensed further includes storing the identified denomination.

12. The method of claim 8, further including:
prior to receiving the request for funds:
scanning, by the computing device and via the scanning device of the self-service kiosk, all currency bills in the storage area of the self-service kiosk to identify a unique identifier associated with each currency bill and a denomination of each currency bill; and
storing, by the computing device and in the bill identification database, the unique identifier and denomination of all currency bills in the storage area of the self-service kiosk.

13. The method of claim 12, further including:
capturing, by the computing device, additional information associated with a current location, date and time for each currency bill in the storage area of the self-service kiosk; and
storing, by the computing device, the captured additional information in the bill identification database.

14. The method of claim 8, wherein the indication of an error includes an indication that the second plurality of currency bills did not dispense.

15. One or more non-transitory computer-readable media storing instructions that, when executed by a computing device comprising at least one processor, memory, and a communication interface, cause the computing device to:
receive a request for funds, the request for funds including a request for an amount of currency,
select, from a first plurality of currency bills in a storage area of a self-service kiosk, a second plurality of currency bills corresponding to the amount of currency;
transfer the second plurality of currency bills from the storage area to a dispensing device of the self-service kiosk;
identify, by a scanning device of the self-service kiosk and using optical character recognition, a unique identifier associated with each currency bill of the second plurality of currency bills;
store, in a bill identification database, the identified unique identifiers associated with each currency bill of the second plurality of currency bills and an indication that the second plurality of currency bills are being dispensed;
receive an indication of an error by the self-service kiosk;
responsive to receiving the indication of the error, scan, by the scanning device of the self-service kiosk, all currency bills within the self-service kiosk to identify the unique identifier associated with each currency bill within the self-service kiosk;
determine, based on the identified unique identifier associated with each currency bill within the self-service kiosk, whether the currency bills of the second plurality of currency bills are present within the self-service kiosk;
responsive to determining the currency bills of the second plurality of currency bills are present within the self-service kiosk, executing an instruction to credit an account of a user associated with the request for funds in the amount of the currency; and
responsive to determining the currency bills of the second plurality of currency bills are not present in the self-service kiosk, flagging the indication of the error as unauthorized activity and executing an instruction to lock the account of the user associated with the request for funds.

16. The one or more non-transitory computer-readable media of claim 15, further including instructions that, when executed, cause the computing device to:
responsive to receiving the indication of the error, activate one or more image capture devices of the self-service kiosk.

17. The one or more non-transitory computer-readable media of claim 16, further including instructions that, when executed, cause the computing device to:
receive, from the one or more image capture devices, image data; and
analyze the image data,
wherein determining whether the currency bills of the second plurality of currency bills are present within the self-service kiosk is further based on the analyzed image data.

18. The one or more non-transitory computer-readable media of claim 15, further including instructions that, when executed, cause the computing device to:
identify, by the scanning device of the self-service kiosk and using optical character recognition, a denomination of each currency bill of the second plurality of currency bills, and wherein storing, in the bill identification database, the identified unique identifiers associated with each currency bill of the second plurality of currency bills and an indication that the second plurality of currency bills are being dispensed further includes storing the identified denomination.

19. The one or more non-transitory computer-readable media of claim 15, further including instructions that, when executed, cause the computing device to:
  prior to receiving the request for funds:
    scanning, by the scanning device of the self-service kiosk, all currency bills in the storage area of the self-service kiosk to identify a unique identifier associated with each currency bill and a denomination of each currency bill; and
    storing, by the bill identification database, the unique identifier and denomination of all currency bills in the storage area of the self-service kiosk.

20. The one or more non-transitory computer-readable media of claim 19, further including instructions that, when executed, cause the computing device to:
  capture additional information associated with a current location, date and time for each currency bill in the storage area of the self-service kiosk; and
  storing the captured additional information in the bill identification database.

21. The one or more non-transitory computer-readable media of claim 15, wherein the indication of an error includes an indication that the second plurality of currency bills did not dispense.

\* \* \* \* \*